US009541756B2

(12) United States Patent
Saiga et al.

(10) Patent No.: US 9,541,756 B2
(45) Date of Patent: Jan. 10, 2017

(54) OPTICAL APPARATUS, IMAGE FORMING APPARATUS, AND IMAGE READING APPARATUS

(71) Applicant: CANON KABUSHIKI KAISHA, Tokyo (JP)

(72) Inventors: Takeyoshi Saiga, Tokyo (JP); Masayasu Teramura, Utsunomiya (JP); Yu Miyajima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/655,082

(22) PCT Filed: Dec. 18, 2013

(86) PCT No.: PCT/JP2013/085017
§ 371 (c)(1),
(2) Date: Jun. 24, 2015

(87) PCT Pub. No.: WO2014/104264
PCT Pub. Date: Jul. 3, 2014

(65) Prior Publication Data
US 2016/0195717 A1     Jul. 7, 2016

(30) Foreign Application Priority Data

Dec. 27, 2012   (JP) ................................ 2012-284439

(51) Int. Cl.
*G03G 15/04*      (2006.01)
*G02B 27/00*      (2006.01)
(Continued)

(52) U.S. Cl.
CPC ........... *G02B 27/0075* (2013.01); *G02B 3/005* (2013.01); *G02B 3/0062* (2013.01); *G02B 13/08* (2013.01);
(Continued)

(58) Field of Classification Search
CPC .................. G03G 15/04054; G03G 15/04063; G03G 15/04072; G03G 2215/0404; G03G 2215/0407; G03G 2215/0409; G03G 2215/0412; G02B 27/0075; G02B 27/0031; G02B 13/08; G02B 3/0062; G02B 3/005; H04N 1/02409; H04N 1/02418; H04N 1/0282
(Continued)

(56) References Cited

U.S. PATENT DOCUMENTS 4,168,900 A * 9/1979 Adachi ................ G02B 3/0012
                                                    355/1
4,512,641 A * 4/1985 Mochizuki ............... G02B 3/00
                                                    359/362
(Continued)

FOREIGN PATENT DOCUMENTS

JP       61007817 A  *  1/1986
JP      63-274915 A     11/1988
(Continued)

*Primary Examiner* — Robert Beatty
(74) *Attorney, Agent, or Firm* — Canon USA Inc., IP Division

(57) ABSTRACT

An optical apparatus includes: a light source including multiple light-emitting points arrayed in a first direction; and an imaging optical system including multiple lens optical systems arrayed in the first direction. The imaging optical system forms images of the multiple light-emitting points on a light-receiving surface. In a first cross-section and in a second cross-section, half-value of a maximum value of angle of divergence of an imaging optical flux input to the light-receiving surface, resolution, and a size of each image of the plurality of light-emitting points formed on the light-receiving surface, satisfy predetermined conditions.

19 Claims, 17 Drawing Sheets

(51) Int. Cl.
*G02B 3/00* (2006.01)
*G02B 13/08* (2006.01)
*G02B 13/26* (2006.01)
*G02B 13/24* (2006.01)
*H04N 1/024* (2006.01)
*H04N 1/028* (2006.01)

(52) U.S. Cl.
CPC ............... *G02B 13/24* (2013.01); *G02B 13/26* (2013.01); *G03G 15/04036* (2013.01); *G03G 15/04054* (2013.01); *G03G 15/04063* (2013.01); *H04N 1/0282* (2013.01); *H04N 1/02409* (2013.01); *H04N 1/02418* (2013.01); *G02B 27/0018* (2013.01)

(58) Field of Classification Search
USPC .................................................. 399/218, 220
See application file for complete search history.

(56) References Cited

U.S. PATENT DOCUMENTS

| | | | | |
|---|---|---|---|---|
| 5,465,265 A | * | 11/1995 | Ota | G02B 3/005 257/88 |
| 2003/0142877 A1 | * | 7/2003 | George | G02B 3/04 382/254 |
| 2004/0130790 A1 | * | 7/2004 | Sales | G02B 3/0043 359/619 |
| 2011/0134495 A1 | * | 6/2011 | Nagata | G02B 3/0062 358/474 |
| 2014/0192384 A1 | * | 7/2014 | Numata | G03G 15/043 358/300 |
| 2015/0168864 A1 | * | 6/2015 | Herloski | G03G 15/04054 347/224 |

FOREIGN PATENT DOCUMENTS

| | | |
|---|---|---|
| JP | 06-208081 A | 7/1994 |
| JP | 06-250117 A | 9/1994 |
| JP | 2002-350724 A | 12/2002 |
| JP | 2003-114305 A | 4/2003 |
| JP | 2003-302504 A | 10/2003 |
| JP | 2009-098613 A | 5/2009 |
| JP | 2010-008783 A | 1/2010 |
| JP | 2011-221175 A | 11/2011 |
| JP | 2012-163850 A | 8/2012 |
| JP | 2012-185229 A | 9/2012 |
| JP | 2012-185390 A | 9/2012 |
| JP | 2012-247565 A | 12/2012 |

* cited by examiner

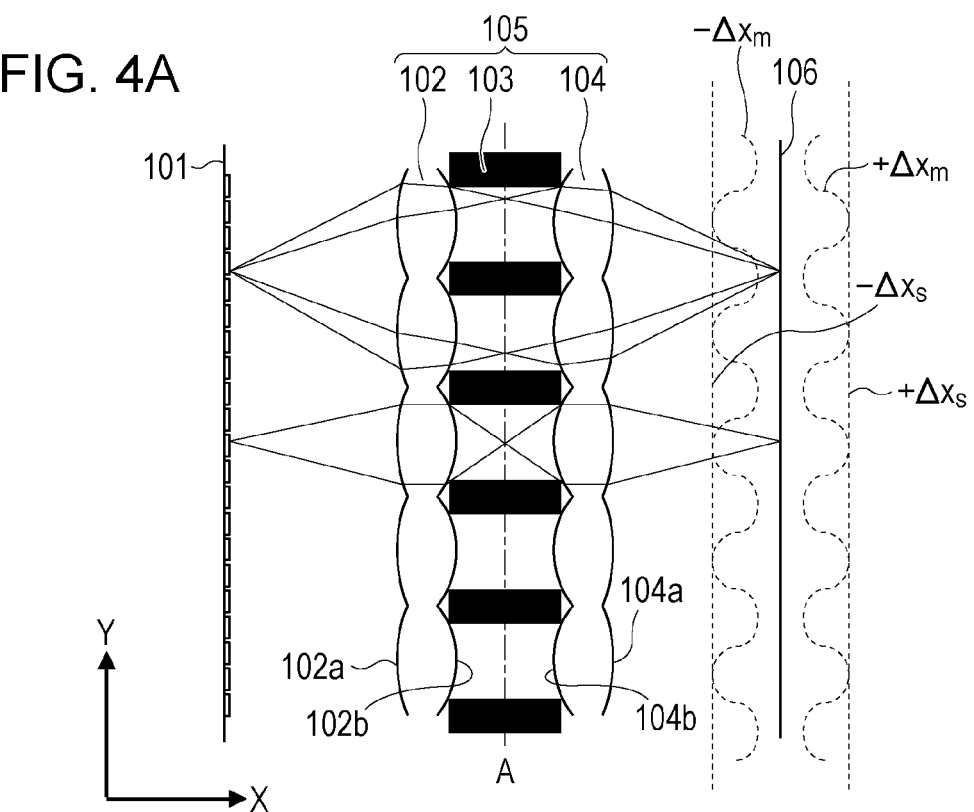
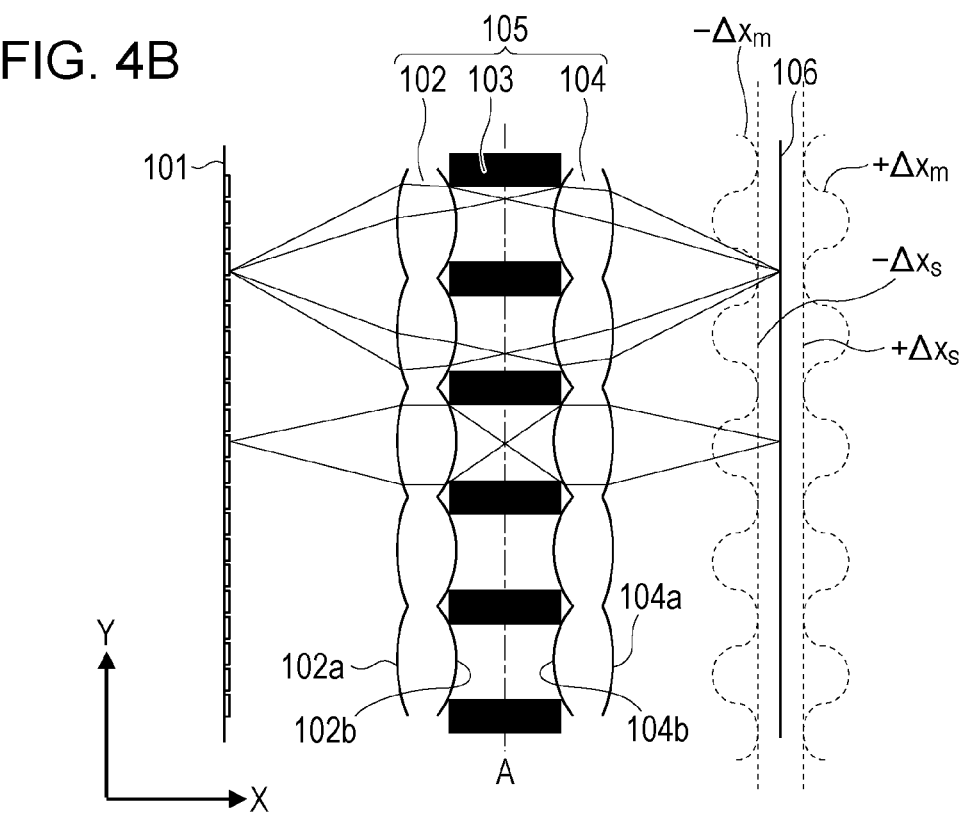

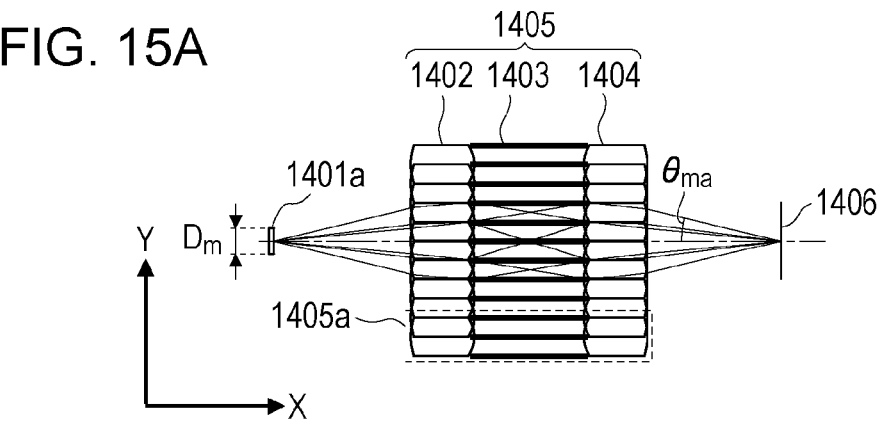
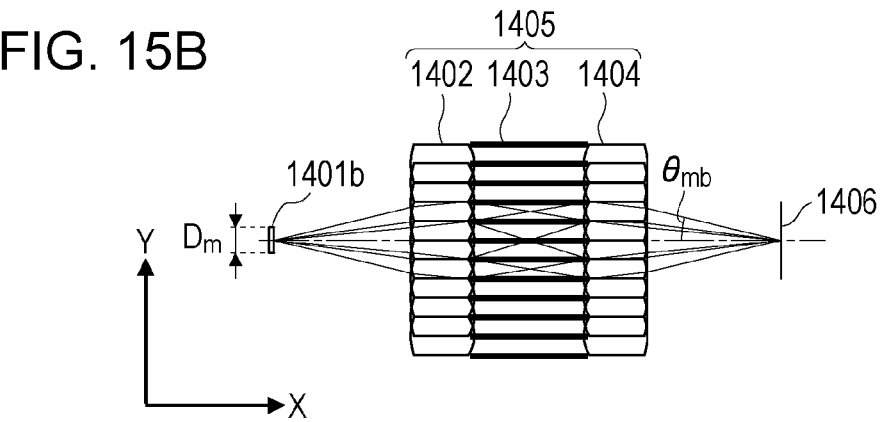
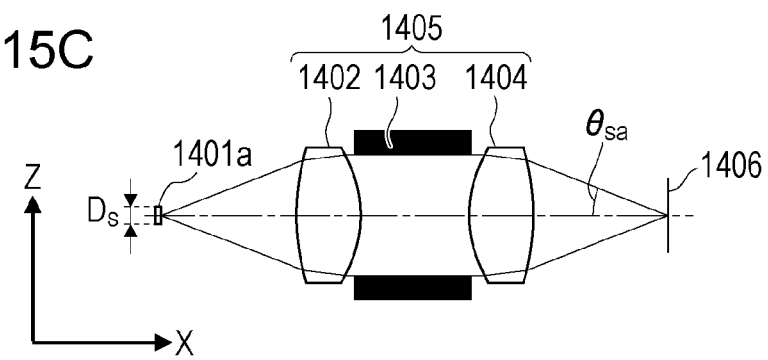
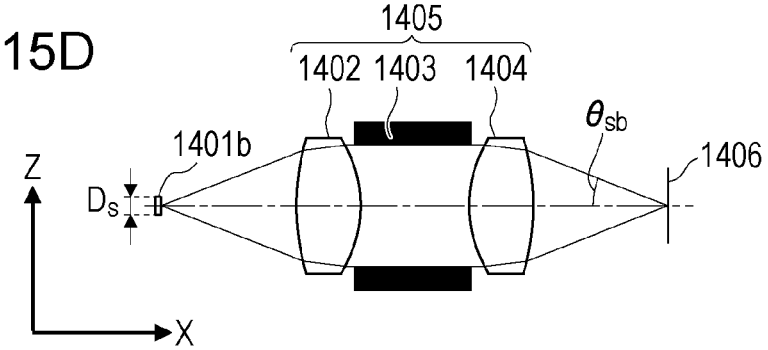

OPTICAL APPARATUS, IMAGE FORMING APPARATUS, AND IMAGE READING APPARATUS

TECHNICAL FIELD

The present invention relates to an optical apparatus, and more particularly an optical apparatus suitably applied to an image forming apparatus or image reading apparatus, for example.

BACKGROUND ART

As of recent, there have been developed image forming apparatuses and image reading apparatus including optical apparatuses which have a lens array made up of multiple lenses. This configuration enables realization of reduction in apparatus size and costs, in comparison with configurations scanning a photosensitive member by a polygon mirror, configurations reading images using multiple lenses and mirrors, and so forth.

Japanese Patent Application Laid-Open No. 63-274915 (hereinafter referred to as "PTL 1") discloses a lens array in which multiple lenses are arrayed in one direction (first direction). Each of the multiple lenses perform erecting same-size imaging of an object within a cross-section parallel to the first direction and optical axis direction (first cross-section), and perform inverted same-size imaging of an object within a cross-section perpendicular to the first direction (second cross-section). This configuration enables the lens power to be smaller within the second cross-section, as compared with an optical system performing erecting same-size imaging in the first cross-section. This is advantageous in realizing both resolution and light available efficiency.

Now, let us consider depth of field as being indicative of imaging capabilities of the lens array, in addition to resolution. Depth of field indicates a range on the optical axis over which a predetermined resolution can be obtained in front of and behind the image field position. Normally, a lens array having a great depth of field has lower light available efficiency, and a lens array having great light available efficiency has lower depth of field. Further, a lens array has to have resolution ensured within the first and second cross-sections, so consideration has to be given to common field of depth within both cross-sections.

However, the lens array disclosed in PTL 1 does not take into consideration the common depth of field within both the first and second cross-sections when receiving input of light rays from the light-emission points of an array light source. That is to say, the lens array described in PTL 1 is of a configuration where the depth of field in the first cross-section and the depth of field in the second cross-section are different. The common depth of field is determined by the smaller of the depths of field in both cross-sections, so the lens array according to PTL 1 has secured unnecessarily great depth of field in one cross-section. Accordingly, the lens array disclosed in PTL 1 is not an optimal configuration for realizing both resolution and light available efficiency, since light available efficiency is lost by the amount exceeding the common depth of field at one cross-section.

Also, the common depth of field of the lens array differs according to the position of each light-emitting point of the array light source, as well. Accordingly, difference in light-emitting point has to be taken into consideration to realize both resolution and light available efficiency, but there is no disclosure or suggestion of taking difference in light-emitting point with regard to the lens array described in PTL 1.

CITATION LIST

Patent Literature

PTL 1 Japanese Patent Application Laid-Open No. 63-274915

SUMMARY OF INVENTION

It has been found desirable to provide an optical apparatus in which both light available efficiency and imaging capabilities are realized at each of the first and second cross-sections.

An optical apparatus according to an aspect of the present invention includes: a light source including a plurality of light-emitting points arrayed in a first direction; and an imaging optical system including a plurality of lens optical systems arrayed in the first direction. The imaging optical system forms images of the plurality of light-emitting points on a light-receiving surface. Conditions of

[Math. 1]
$$0.8 \leq \frac{P_m}{P_s} \frac{1 - P_s D_s}{1 - P_m D_m} \frac{\tan\theta_m}{\tan\theta_s} \leq 1.2$$

are satisfied, where in a first cross-section which is parallel to the first direction and an axial direction of the lens optical systems, $\theta_m$ represents a half-value of a maximum value of angle of divergence (aperture angle) of an imaging optical flux input to the light-receiving surface, $P_m$ represents resolution, and $D_m$ represents a size of each image of the plurality of light-emitting points, formed on the light-receiving surface, and in a second cross-section which is perpendicular to the first direction, $\theta_s$ represents a half-value of a maximum value of angle of divergence (aperture angle) of an imaging optical flux input to the light-receiving surface, $P_s$ represents resolution, and $D_s$ represents a size of each image of the plurality of light-emitting points, formed on the light-receiving surface.

Further features of the present invention will become apparent from the following description of exemplary embodiments with reference to the attached drawings.

BRIEF DESCRIPTION OF DRAWINGS

FIGS. 4A and 4B are diagrams for describing how depths of field are arrayed.

FIGS. 15A through 15D are diagrams illustrating the way in which light-emitting points according to the sixth embodiment are imaged.

DESCRIPTION OF EMBODIMENTS

Description will be made below regarding embodiments of the present invention, with reference to the drawings.

First Embodiment

Figure 1A:
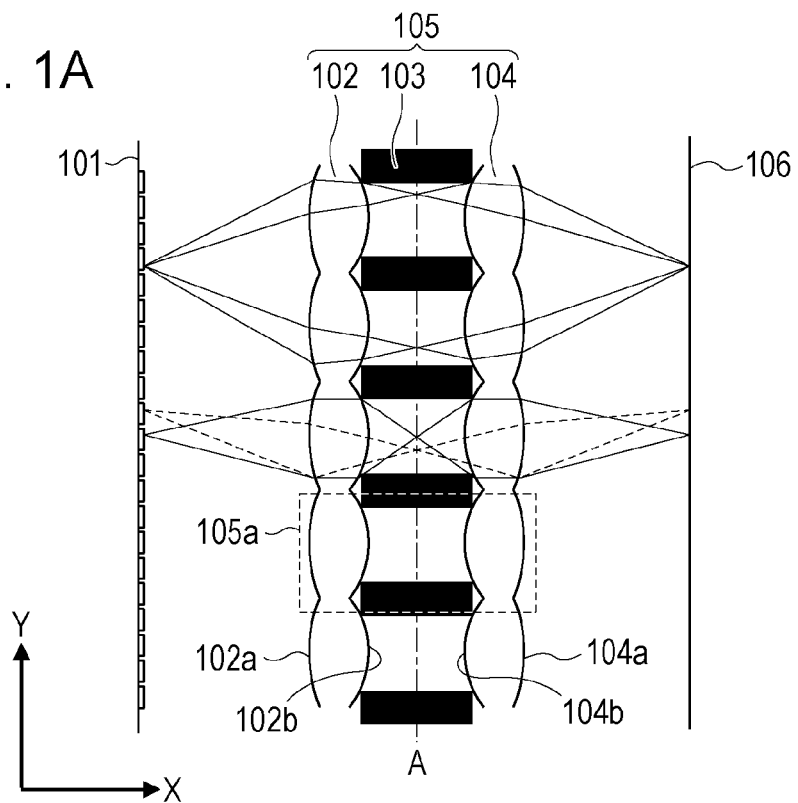
FIGS. 1A through 1C are schematic diagrams of principal portions of an optical apparatus according to a first embodiment.
Figure 1B:
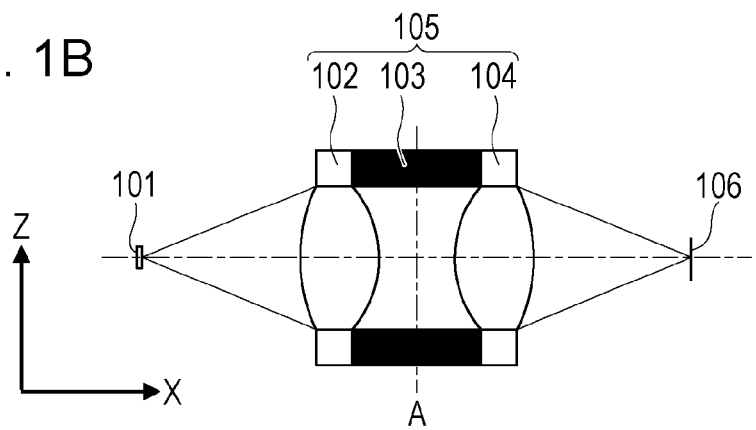
Figure 1C:
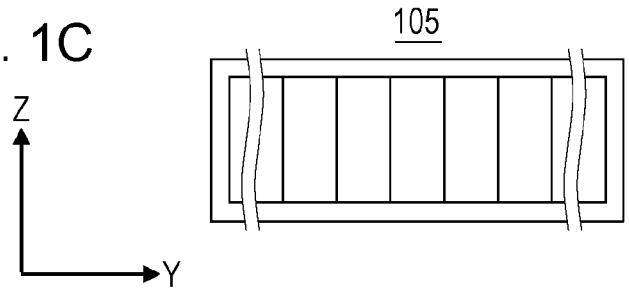

FIGS. 1A through 1C are schematic diagrams of principal portions of an optical apparatus according to a first embodiment applied to an image forming apparatus. FIG. 1A illustrates a first cross-section (X-Y cross-section), FIG. 1B illustrates a second cross-section (Z-X cross-section), and FIG. 1C is a frontal view from the optical axis direction (X direction). The optical apparatus according to the present embodiment includes a light source 101 including multiple light-emitting points arrayed on an object plane, and an imaging optical system 105 which condenses multiple light rays emitted from the light source 101 upon a light-receiving surface 106 (image plane).

The light source 101 includes multiple light-emitting points arrayed at equal intervals in a first direction (Y direction). LEDs, organic electroluminescence (EL) devices (elements), laser devices, or the like may be used for the light-emitting points. A photosensitive member such as a photosensitive drum is disposed at the light-receiving surface 106. In a case where the optical apparatus is to be applied to an image reading apparatus, a document is positioned instead of the light source 101, and a photoreceptor sensor (line sensor) such as a CMOS sensor or the like is positioned at the light-receiving surface 106 instead of a photosensitive member.

The imaging optical system 105 is a lens array including imaging units 102 and 104 which include multiple lens units arrayed in the first direction, and shielding portions 103 to shield stray light rays. The imaging units 102 and 104 are configured having one row in the second direction (Z direction) of a lens row where multiple lens portions of the same shape are arrayed at equal intervals in the first direction, as illustrated in FIG. 1C. Hereinafter, the lens portions in imaging units 102 and 104 which are disposed on the same optical axis will be collectively described as lens optical system 105a.

Lens surfaces 102a, 102b, 104a, and 104b of the lens optical system 105a all have anamorphic aspheric forms (anamorphic surfaces). The shielding portions 103 serve to allow, of the light rays passing through the imaging unit 102, light rays that contribute to imaging to pass through, and shield stray light rays not contributing to imaging. In the following description, the thickness (width in second direction) of the shielding portions 103 is excluded from consideration.

The lens portions of the imaging unit 102 condense the multiple light rays emitted from the light source 101 on an intermediate imaging plane A in the first cross-section (X-Y cross-section) parallel to the first direction and the optical axis direction of the lens optical system 105a as illustrated in FIG. 1A. Note that the intermediate imaging plane A is an imaginary plane where the imaging unit 102 forms an intermediate image of the light source 101 (object plane), i.e., performs intermediate imaging of the object plane. The intermediate imaging plane A exists at an approximately intermediate position between the light source 101 and the light-receiving surface 106 (image plane). Light rays temporarily condensed at the intermediate imaging plane A enter each lens portion of the imaging unit 104, and further are condensed at the light-receiving surface 106. That is to say, the imaging unit 104 forms an image of the intermediate image of the light source 101 on the light-receiving surface 106. In other words, the intermediate image is re-imaged upon the light-receiving surface 106.

Thus, the imaging optical system 105 according to the present embodiment (lens optical system 105a) is a system performing erecting same-size imaging of the light-emitting points on the light-receiving surface 106, in the X-Y cross-section, i.e., is an erecting same-size imaging system. On the other hand, in the second cross-section (Z-X cross-section) perpendicular to the first direction, the imaging optical system 105 (lens optical system 105a) is a system performing inverted same-size imaging of the light-emitting points on the light-receiving surface 106 without performing intermediate imaging, i.e., is an inverted same-size imaging system, as illustrated in FIG. 1B. While countless light rays actually are being condensed by the imaging units 102 and 104, only a few characteristic light rays are illustrated in FIG. 1A.

Properties of the imaging optical system 105 according to the present embodiment are shown in Table 1.

TABLE 1

| | | | Aspheric form | | | | | | | |
|---|---|---|---|---|---|---|---|---|---|---|
| Configuration | | | Lens surface 102a | | Lens surface 102b | | Lens surface 104b | | Lens surface 104a | |
| Resolution | dpi | 600 | | | | | | | | |
| Wavelength | λ(nm) | 780 | R | 0 | R | 0 | R | 0 | R | 0 |
| Refractive index | n(λ = 780 nm) | 1.486 | k | 0 | k | 0 | k | 0 | k | 0 |
| F-No. in first direction of lens unit | Fno_m | 3.90 | A20 | 0.50277 | A20 | −0.82549 | A20 | 0.82549 | A20 | −0.50277 |
| F-No. in second direction of lens unit | Fno_s | 1.30 | A40 | −0.51259 | A40 | 0.29164 | A40 | −0.29164 | A40 | 0.51259 |
| Power in first direction of lens unit | βm | −0.45 | A60 | −0.24716 | A60 | −0.55971 | A60 | 0.55971 | A60 | 0.24716 |
| Array pitch in first direction of lens unit | p(mm) | 0.77 | A80 | 0.08357 | A80 | −0.01894 | A80 | 0.01894 | A80 | −0.08357 |
| Number of optical systems arrayed in first direction of lens unit | Nm(count) | 291 | A100 | −6.91825 | A100 | −0.78249 | A100 | 0.78249 | A100 | 6.91825 |
| Number of optical systems arrayed in second direction of lens unit | Ns(count) | 1 | A02 | 0.15643 | A02 | −0.19504 | A02 | 0.19504 | A02 | −0.15643 |
| Maximum object height of which lens unit can intake light | L(mm) | 0.768 | A22 | −0.15873 | A22 | 0.09481 | A22 | −0.09481 | A22 | 0.15873 |
| Size of light-emitting point in first direction | Dm(um) | 42.30 | A42 | −0.15055 | A42 | −0.30023 | A42 | 0.30023 | A42 | 0.15055 |
| Size of light-emitting point in second direction | Ds(um) | 25.40 | A62 | 5.65920 | A62 | 3.06561 | A62 | −3.06561 | A62 | −5.65920 |
| Aperture size | | | A82 | −13.83601 | A82 | −6.53977 | A82 | 6.53977 | A82 | 13.83601 |
| Aperture size in first direction of imaging unit 102 | Am1(mm) | 0.7 | A04 | −0.03679 | A04 | −0.00756 | A04 | 0.00756 | A04 | 0.03679 |
| Aperture size in second direction of imaging unit 102 | As1(mm) | 244 | A24 | 0.14799 | A24 | 0.03211 | A24 | −0.03211 | A24 | −0.14799 |
| Aperture size in first direction of imaging unit 104 | Am2(mm) | 0.7 | A44 | −1.03706 | A44 | −0.59005 | A44 | 0.59005 | A44 | 1.03706 |
| Aperture size in second direction of imaging unit 104 | As2(mm) | 2.44 | A64 | −1.89450 | A64 | −0.69876 | A64 | 0.69876 | A64 | 1.89450 |
| Placement | | | A06 | 0.01270 | A06 | 0.00111 | A06 | −0.00111 | A06 | −0.01270 |
| Distance between light source 101 and lens surface 102a | d1(mm) | 2.65 | A26 | −0.07715 | A26 | −0.00101 | A26 | 0.00101 | A26 | 0.07715 |
| Distance between lens surface 102a and lens surface 102b | d2(mm) | 1.25 | A46 | 0.97142 | A46 | 0.41327 | A46 | −0.41327 | A46 | −0.97142 |
| Distance between lens surface 102b and lens surface 104a | d3(mm) | 2.16 | A08 | −0.00611 | A08 | −0.00105 | A08 | 0.00105 | A08 | 0.00611 |
| Distance between lens surface 104a and lens surface 104b | d4(mm) | 1.25 | A28 | −0.01342 | A28 | −0.01827 | A28 | 0.01827 | A28 | 0.01342 |
| Distance between lens surface 104b and light-receiving surface 106 | d5(mm) | 2.65 | A010 | 0.00128 | A010 | 0.00010 | A010 | −0.00010 | A010 | −0.00128 |

If we say that the intersection with the optical axis (X axis) at each lens portion of the imaging optical system 105 is the origin, the axis orthogonal to the optical axis in the first direction is the Y axis, and the axis orthogonal to the optical axis in the second direction is the Z axis, the aspheric form of each lens surface is expressed by the following Expression (1), where R represents the radius of curvature, k represents the conical constant, and $A_{ij}$ (i=0, 1, 2, 3, 4, 5 . . . , j=0, 1, 2, 3, 4, 5 . . . ) is aspheric constants.

[Math. 2]

$$x = \frac{\frac{y^2 + z^2}{R}}{1 + \sqrt{1 - (1+k)\left(\frac{\sqrt{y^2+z^2}}{R}\right)^2}} + \sum_{i=0}^{8}\sum_{j=0}^{8} A_{ij} y^{2i} z^{2j} \quad (1)$$

A method to design the optical apparatus according to the present embodiment will be described with reference to FIG. 2.

Figure 2:
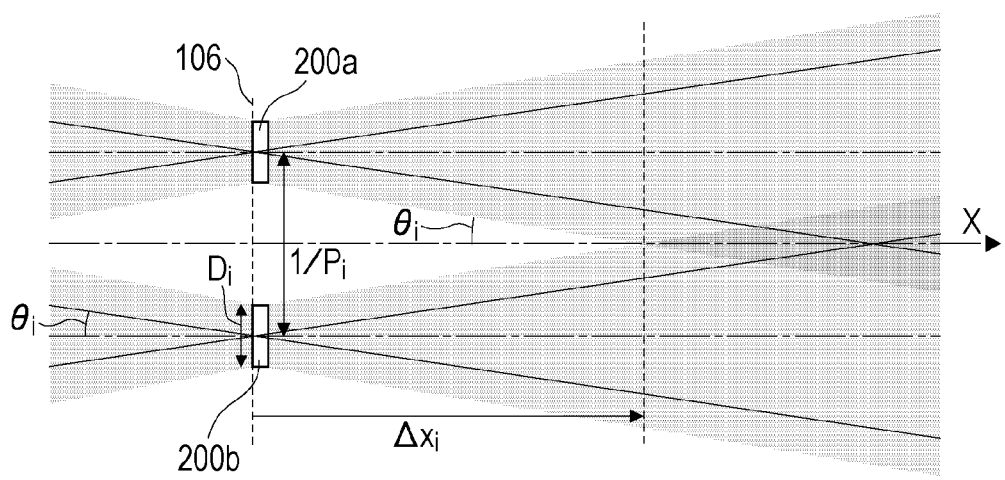
FIG. 2 is a conceptual diagram for describing depth of field.

FIG. 2 is a conceptual diagram illustrating images (200*a* and 200*b*) of two adjacent light-emitting points, formed on the light-receiving surface 106, to evaluate resolution as $P_i$. The interval between the two images is set to $1/P_i$. $\Delta x_i$ in FIG. 2 represents the distance from the light-receiving surface 106 where the two images 200*a* and 200*b* begin to overlap due to defocusing (defocus tolerance value), which indicates a half-value of the depth of field when the contrast is 100%. To say that "contrast is 100%" means contrast when the two images 200*a* and 200*b* do not overlap, and are completely separated (resolved).

Also, $\theta_i$ is the half-value of the angle of divergence (aperture angle) of the optical fluxes forming the images (imaging fluxes). We can see from FIG. 2 that the half-value of the angle formed between the light ray on the extreme periphery of the multiple light rays making up the imaging optical flux forming the image 200*a*, and the light ray on the extreme periphery of the multiple light rays making up the imaging optical flux forming the image 200*b*, is also $\theta_i$. $D_i$ is the size of the images 200*a* and 200*b* formed on the light-receiving surface 106. Note that the parameters in FIG. 2 represent a parameter within the X-Y cross-section when the suffix i=m, and represent a parameter within the Z-X cross-section when the suffix i=s.

The following relationship is derived from FIG. 2 for the parameters, such as shown in the following Expression (2).

[Math. 3]

$$2\Delta x_i \tan\theta_i = \frac{1}{P} - D_i \quad (2)$$

Transforming Expression (2) yields the defocusing tolerance value $\Delta x_i$ when contrast is 100%, shown in the following Expression (3).

[Math. 4]

$$\Delta x_i = \frac{1 - P_i D_i}{2 P_i \tan\theta_i} \quad (3)$$

$P_i$ and $D_i$ are decided by the printing dot size set at the image forming apparatus (or image reading apparatus) into which the optical apparatus information has been built, and accordingly are constant for each apparatus model and each printing mode. Also, the light available efficiency of the imaging optical system 105 is proportionate to the half-value $\theta_i$ of the angle of divergence (aperture angle) of the imaging optical flux, and accordingly is approximately proportionate to $\tan\theta_i$. We can further see from Expression (3) that $\Delta x_i$ is inversely proportionate to $\tan\theta_i$. Thus, we can see that light available efficiency and depth of field are in an inversely proportionate relationship.

Let us consider making the depth of field at each of the X-Y cross-section and Z-X cross-section approximately equal, in order to ensure resolution within both cross-sections and also to realize both light available efficiency and imaging capabilities. Making the depth of field at each of the X-Y cross-section and Z-X cross-section approximately equal means satisfying the following conditional Expression (4).

[Math. 5]

$$0.8 \leq \frac{\Delta x_s}{\Delta x_m} \leq 1.2 \quad (4)$$

Substituting Expression (3) into Expression (4) yields the following conditional Expression (5).

[Math. 1]

$$0.8 \leq \frac{P_m}{P_s} \frac{1 - P_s D_s}{1 - P_m D_m} \frac{\tan\theta_m}{\tan\theta_s} \leq 1.2 \quad (5)$$

The aperture size of the lens optical systems 105a in the first and second directions have been designed in the present embodiment so as to satisfy Expression (5). Accordingly, the depth of field in both the X-Y cross-section and Z-X cross-section can be kept from becoming unnecessarily high as to the common depth of field. That is to say, an optimal optical configuration can be achieved to realize both light available efficiency and imaging capabilities (resolution) in both cross-sections.

The range of values in Expressions (4) and (5) will be described here. Normally, if change in astigmatic difference occurs due to error in placement of members of the optical apparatus, the common depth of field can drop as much as 20% or so. The effects of placement error of the members making up the optical apparatus differ depending on whether within the X-Y cross-section or within the Z-X cross-section, so the configuration is preferably designed with this difference in mind, such that the common depth of field has some leeway.

Accordingly, the optical apparatus according to the present embodiment is configured so that the ratio between $\Delta x_s$ and $\Delta x_m$ is contained within a range of 0.8 to 1.2 as shown in Expressions (4) and (5), taking the effects of placement error and so forth into consideration. When the ratio between $\Delta x_s$ and $\Delta x_m$ falls out of the range of Expressions (4) and (5), the difference in depth of field between the X-Y cross-section and Z-X cross-section becomes great, so good imaging capability while securing light available efficiency at both cross-sections cannot be achieved. Further, if the effects of placement error can be maximally suppressed, a configuration satisfying the following Expression (6) is even more desirable.

[Math. 6]

$$0.85 \leq \frac{P_m}{P_s} \frac{1 - P_s D_s}{1 - P_m D_m} \frac{\tan\theta_m}{\tan\theta_s} \leq 1.15 \quad (6)$$

Next, change in the depth of field at each light-emitting point will be described. First, the behavior of each light-emitting point of the light source 101 being imaged on the light-receiving surface 106 by the imaging optical system 105 in the X-Y cross-section will be described with reference to FIGS. 3A and 3B.

Figure 3A:
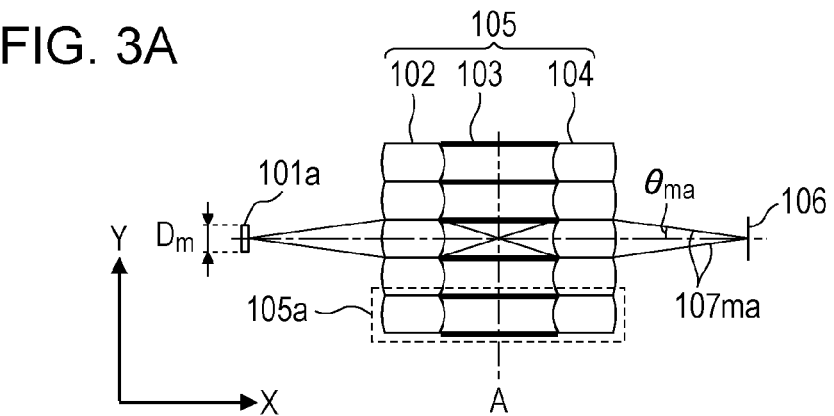
FIGS. 3A through 3D are diagrams illustrating the way in which light-emitting points according to the first embodiment are imaged.

FIG. 3A is a diagram illustrating the way in which a light-emitting point 101a situated on the optical axis of one lens optical system 105a (hereinafter, referred as "at axial object height") is imaged on the light-receiving surface 106 in the X-Y cross-section. Light rays emitted from the light-emitting point 101a are temporarily condensed at the intermediate imaging plane A by way of the imaging unit 102, and subsequently condensed on the light-receiving surface 106 by way of the imaging unit 104. At this time, the light rays emitted from the light-emitting point 101a each only pass through one lens portion at each of the imaging units 102 and 104. That is to say, in the X-Y cross-section, the number of lens optical systems 105a which the light rays emitted from the light-emitting point at axial object height pass through is one. Note that the half-value of the incident angle of an extreme periphery light ray 107ma of the light rays passing through that lens optical system 105a when entering the light-receiving surface 106, i.e., the half-value of the angle of divergence of the imaging optical flux of the light rays emitted from the light-emitting point 101a, is $\theta_{ma}$ of 7.32 degrees.

Figure 3B:
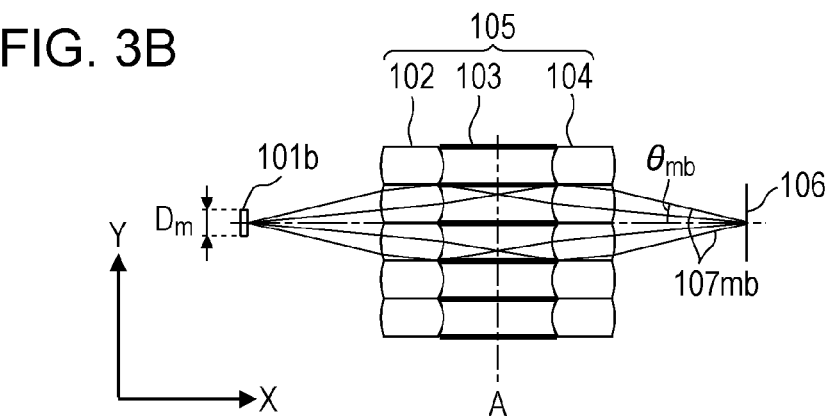

On the other hand, FIG. 3B is a diagram illustrating the way in which a light-emitting point 101b of which light passes through an intermediate position between optical axes of adjacent lens optical systems 105a (hereinafter, referred as "at intermediate object height") is imaged on the light-receiving surface 106 in the X-Y cross-section. Light rays emitted from the light-emitting point 101b are temporarily condensed at the intermediate imaging plane A by way of the imaging unit 102, and subsequently condensed on the light-receiving surface 106 by way of the imaging unit 104, in the same way as with the light rays emitted from the light-emitting point 101a. At this time, the light rays emitted from the light-emitting point 101b pass through two lens portions at each of the imaging units 102 and 104. That is to say, in the X-Y cross-section the number of lens optical systems 105a which the light rays emitted from the light-emitting point at intermediate object height pass through is two. Note that the half-value of the incident angle of an extreme periphery light ray 107mb of the light rays passing through that lens optical system 105a when entering the light-receiving surface 106, i.e., the half-value of the angle of divergence of the imaging optical flux of the light rays emitted from the light-emitting point 101b, is $\theta_{mb}$ of 13.46 degrees.

Thus, the number of lens optical systems 105a which the light rays emitted from the light-emitting points pass through in the X-Y cross-section differ according to the position of the light-emitting point, so the half-value $\theta_m$ of the angle of divergence of the imaging optical flux also changes in accordance with the position of the light-emitting point. Note that the maximum (greatest) number of lens optical systems 105a to pass through is for the imaging optical flux emitted from a light-emitting point at intermediate object height (light-emitting point 101b). That is to say, the half-value $\theta_m$ of the angle of divergence of the imaging optical flux formed by light rays from a light-emitting point at intermediate object height (light-emitting point 101b) can be deemed to be the greatest (maximum value). Accordingly, the depth of field for an imaging optical flux emitted from a light-emitting point at intermediate object height is the smallest of the light-emitting points of the light source 101.

To be precise, the half-value $\theta_m$ of the angle of divergence of the imaging optical flux from a light-emitting point at intermediate object height (light-emitting point 101b) is not the maximum. However, the half-value $\theta_m$ of the angle of divergence of the imaging optical flux is almost completely decided by the number of lens optical systems 105a through which the imaging optical flux passes, so we can view difference due to the position of light-emitting points being non-existent if the number of thereof is the same. Accordingly, the half-value $\theta_m$ of the angle of divergence of the imaging optical flux from a light-emitting point at intermediate object height (light-emitting point 101b) is deemed to be the maximum of the multiple light-emitting points in the light source 101 in the present embodiment.

Next, the behavior of each light-emitting point of the light-emitting point 101a and light-emitting point 101b being imaged on the light-receiving surface 106 by the imaging optical system 105 in the Z-X cross-section section will be described with reference to FIGS. 3C and 3D.

Figure 3C:
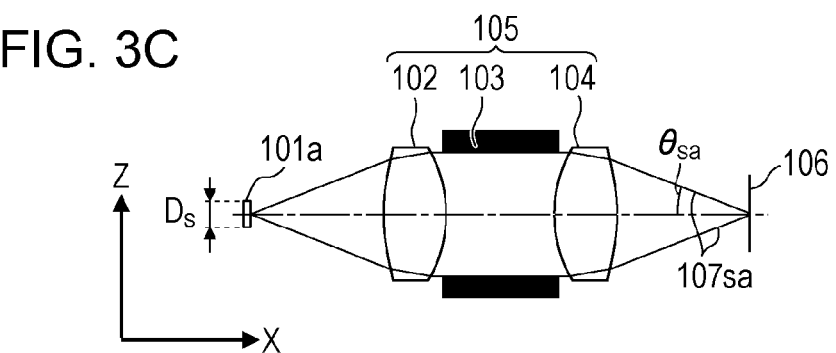

Light rays emitted from the light-emitting point 101a become approximately parallel light by way of the imaging unit 102, and then are input to the imaging unit 104 and condensed on the light-receiving surface 106, as illustrated in FIG. 3C. The imaging optical system 105 here is an inverted same-size imaging system in the Z-X cross-section, so the number of lens rows of the lens optical system 105a which light rays emitted from the light-emitting point 101a pass through is one. In the present embodiment, the number of lens rows in the second direction is one row, so light rays emitted from the light-emitting point 101a only pass through one lens optical system 105a. Note that the half-value of the incident angle of an extreme periphery light ray 107sa of the light rays passing through that lens optical system 105a when entering the light-receiving surface 106, i.e., the half-value of the angle of divergence of the imaging optical flux of the light rays emitted from the light-emitting point 101a, is $\theta_{sa}$ of 21.14 degrees.

Figure 3D:
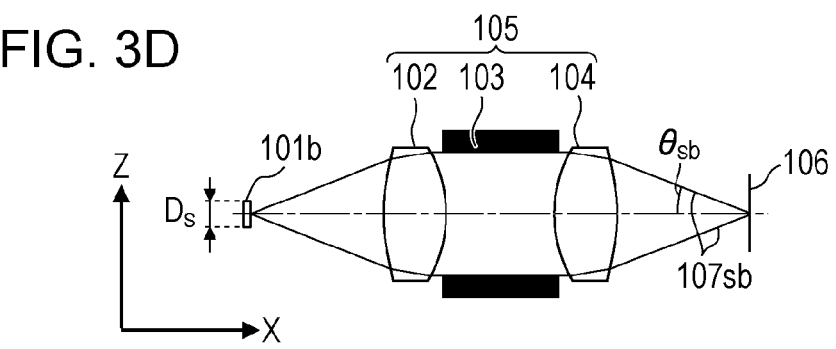

Light rays emitted from the light-emitting point 101b become approximately parallel light by way of the imaging unit 102, and then are input to the imaging unit 104 and condensed on the light-receiving surface 106, as illustrated in FIG. 3D. Accordingly, light rays emitted from the light-emitting point 101b also only pass through one lens optical system 105a, in the same way as with light rays emitted from the light-emitting point 101a. Note that the half-value of the incident angle of an extreme periphery light ray 107sb of the light rays passing through that lens optical system 105a when entering the light-receiving surface 106, i.e., the half-value of the angle of divergence of the imaging optical flux of the light rays emitted from the light-emitting point 101b, is $\theta_{sb}$ of 21.14, the same as with $\theta_{sa}$.

Thus, the number of lens optical systems 105a which the light rays emitted from the light-emitting points pass through in the Z-X cross-section do not differ according to the position of the light-emitting point with the present embodiment, so the half-value $\theta_s$ of the angle of divergence of the imaging optical flux is constant regardless of the position of the light-emitting point. That is to say, the depth of field is constant regardless of the position of the light-emitting point.

Thus, in the optical apparatus according to the present embodiment, the depth of field changes at each light-emitting point position in the X-Y cross-section, and the depth of field is constant regardless of the position of the light-emitting point in the Z-X cross-section.

Let us now consider whether the depth of field should be made equal (made the same) between the X-Y cross-section and Z-X cross-section at the time of any light-emitting point at the light source 101 being imaged by the imaging optical system 105, taking the difference in depth of field at each light-emitting point that has been described above.

FIGS. 4A and 4B are diagrams for describing two patterns of making the depth of field the same. FIGS. 4A and 4B illustrates defocusing tolerance values corresponding to each light-emitting point in the X-Y cross-section, connected by dotted lines $-\Delta x_m$ and $+\Delta x_m$, and illustrates defocusing tolerance values corresponding to each light-emitting point in the Z-X cross-section, connected by solid lines $-\Delta x_s$ and $+\Delta x_s$. That is to say, the intervals between the dotted lines $-\Delta x_m$ and $+\Delta x_m$ indicate the depth of field in the X-Y cross-section as to each light-emitting point, and the intervals between the solid lines $-\Delta x_s$ and $+\Delta x_s$ indicate the depth of field in the Z-X cross-section as to each light-emitting point. As can be understood from FIGS. 4A and 4B, the depth of field in the X-Y cross-section changes at each light-emitting point position, while the depth of field in the Z-X cross-section is constant regardless of light-emitting point position.

FIG. 4A is a pattern where the depth of field in the X-Y cross-section and the depth of field in the Z-X cross-section have been made the same at light-emitting point positions where the depth of field in the X-Y cross-section is the maximum. At this time, the common depth of field is equal to the narrowest depth of field in the X-Y cross-section, so light available efficiency is lost only regarding the difference between the common depth of field and the narrowest depth of field in the X-Y cross-section. On the other hand, FIG. 4B is a pattern where the depth of field in the X-Y cross-section and the Z-X cross-section have been made the same at light-emitting point positions where the depth of field in the X-Y cross-section is the narrowest. At this time, the common depth of field is equal to the narrowest depth of field in the X-Y cross-section and the narrowest depth of field in the Z-X cross-section, so light available efficiency is lost only regarding the difference between the common depth of field and the widest depth of field in the X-Y cross-section.

The amount of loss in light available efficiency is the same between the two patterns illustrated in FIGS. 4A and 4B. That is to say, the depth of field in the Z-X cross-section can be made narrower with the pattern illustrated in FIG. 4B, as compared to the pattern illustrated in FIG. 4A, which is advantageous regarding imaging capabilities. Accordingly, the optical apparatus according to the present embodiment is designed such that the depth of field is approximately the same in the X-Y cross-section and Z-X cross-section when the depth of field is narrowest in X-Y cross-section, i.e., when the light-emitting points at intermediate object height in the lens optical system 105a are imaged on the light-receiving surface 106.

As described above, the depth of field is smallest in the present embodiment when light-emitting points in intermediate object height are imaged on the light-receiving surface 106. At this time, the half-value $\theta_m$ of the maximum value of the angle of divergence of the imaging optical flux in the X-Y cross-section is 13.46 degrees, and the half-value $\theta_s$ of the maximum value of the angle of divergence of the imaging optical flux in the Z-X cross-section is 21.14 degrees. Also note that the imaging optical system 105 according to the present embodiment forms same-size images of each of the light-emitting points of the light source 101 on the light-receiving surface 106, in each of the X-Y cross-section and Z-X cross-section. Thus, the image size $D_m$ on the light-receiving surface 106 in the X-Y cross-section is 42.30 μm which is equal to the size of the light-emitting points, and the image size $D_s$ on the light-receiving surface 106 in the Z-X cross-section is 25.40 μm which is equal to the size of the light-emitting points. Note that resolution P is evaluated as 11.81 lp/mm (equivalent to 600 dpi) in the X-Y cross-section and Z-X cross-section.

Substituting these numerical values into the middle member of conditional Expression (5) yields Expression (7), and we can see that conditional Expression (5) and Expression (6) are satisfied.

[Math. 7]

$$\frac{P_m}{P_s} \frac{1 - P_s D_s}{1 - P_m D_m} \frac{\tan\theta_m}{\tan\theta_s} = 0.87 \qquad (7)$$

Figure 5A:
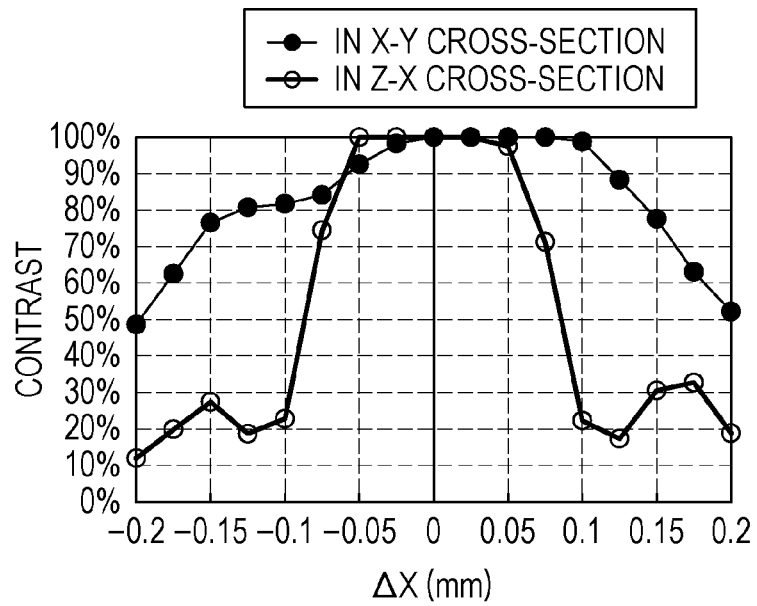
FIGS. 5A and 5B are diagrams illustrating depth of field properties of an imaging optical system according to the first embodiment.
Figure 5B:
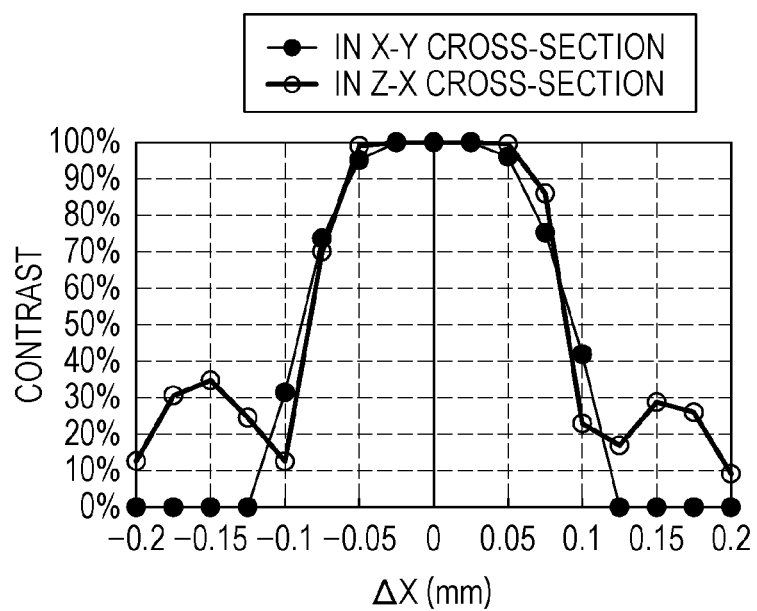

FIGS. 5A and 5B are diagrams illustrating depth properties of the imaging optical system 105 according to the present embodiment in the X-Y cross-section and in the Z-X cross-section. FIG. 5A illustrates the relationship between depth of field and contrast when a light-emitting point at axial object height is imaged on the light-receiving surface 106. The depth of field in the X-Y cross-section is greater than the depth of field in the Z-X cross-section at each contrast value. On the other hand, FIG. 5B illustrates the relationship between depth of field and contrast when a light-emitting point at intermediate object height is imaged on the light-receiving surface 106. The depth of field in the X-Y cross-section and the depth of field in the Z-X cross-section are generally the same at each contrast value.

Table 2 illustrates the depth of field for each of in the X-Y cross-section and in the Z-X cross-section for each contrast and the ratio thereof, when a light-emitting point at intermediate object height is imaged on the light-receiving surface 106.

TABLE 2

| Contrast | Δxm | Δxs | Δxm/Δxs |
|---|---|---|---|
| 100% | 0.073 | 0.104 | 1.33 |
| 90% | 0.113 | 0.125 | 1.03 |
| 80% | 0.137 | 0.144 | 1.00 |
| 70% | 0.156 | 0.156 | 0.98 |
| 60% | 0.170 | 0.165 | 0.96 |
| 50% | 0.183 | 0.173 | 0.94 |
| 40% | 0.196 | 0.181 | 0.93 |

Table 2 shows that the depth of field is approximately equal in the X-Y cross-section and in the Z-X cross-section, in the contrast range of 40 to 90%. That is to say, we can see that the depth of field in the X-Y cross-section and in the Z-X cross-section is the same when a light-emitting point at intermediate object height is being imaged on the light-receiving surface 106. Thus it has been demonstrated that the optical apparatus according to the present embodiment realizes both light available efficiency and imaging capabilities by satisfying conditional Expression (5). The reason that the ratio of depth of field in the X-Y cross-section and in the Z-X cross-section differs from the numerical value in Expression (7) is that the numerical value in Expression (7) is a theoretical value, and in reality there is error due to influence of aberration and the like in the imaging optical system 105.

Note that as described above, conditional Expression (5) has been derived taking into consideration the depth of field when contrast is 100%, so from that perspective, confirmation should be made that the depth of field is the same (approximately equal) in both cross-sections at contrast of 100%. However, as mentioned earlier, confirming at contrast of 100% is difficult, due to aberration of the imaging optical system 105 not being taken into consideration. Accordingly, in a case of applying conditional Expression (5) to an optical apparatus, the ratio of depth of field in both cross-sections is preferably evaluated at contrast of 80 to 90%, taking into consideration the effects of aberration of the imaging optical system 105.

Also, what is demanded of actual image forming apparatuses (and image reading apparatuses) is depth of field evaluated at contrast of 40 to 80%. While conditional Expression (5) has been derived taking into consideration depth of field at contrast of 100%, this can be applied to depth of field at contrast of 40 to 80%, approximatively.

As described above, the optical apparatus according to the present embodiment can provide good imaging capability while securing light available efficiency, by making the depth of field at the time of the imaging optical system 105 imaging light-emitting points at intermediate object height on the light-receiving surface 106 to be approximately equal in the X-Y cross-section and in the Z-X cross-section.

Now, description will be made regarding a conditional expression taking into consideration the maximum number of lens optical systems 105a through which light rays from one light-emitting point of the light source 101 pass. Since the number of lens optical systems 105a through which light rays pass in the Z-X cross-section do not change with the present embodiment, we will consider only the maximum number of lens optical systems 105a through which light rays from one light-emitting point pass in the X-Y cross-section.

The maximum number of lens optical systems 105a through which light rays from one light-emitting point pass is can be expressed by $n_m$=1+integer portion (2×L/p), where L represents the maximum object height regarding which one lens optical system 105a can take in light rays, and p represents the array pitch of lens optical systems. In the case that $n_m$ is an odd number, the half-value $\theta_m$ of the angle of divergence is the greatest (maximum value) when an imaging optical flux from a light-emitting point at intermediate object height is input to the light-receiving surface 106 when $n_m$ is an even number. Accordingly, the value of the maximum half-value $\theta_m$ of the angle of divergence of the imaging optical flux changes according to the value of $n_m$.

Now, $\tan \theta_m$ in the X-Y cross-section described above is expressed as in the following Expression (8), by the array pitch p in the first direction of the lens optical systems 105a, the maximum value $n_m$ of the number of lens optical systems 105a through which light rays pass, and distance l between the imaging unit 104 and light-receiving surface 106.

[Math. 8]

$$\tan\theta_m = \frac{1}{l} \times n_m \times \frac{p}{2} = \frac{n_m p}{2l} \quad (8)$$

Also, $\tan \theta_s$ in the Z-X cross-section is expressed as in the following Expression (9), by the maximum effective width (valid width) T of the imaging optical system 105 in the second direction, and distance l between the imaging unit 104 and light-receiving surface 106.

[Math. 9]

$$\tan\theta_s = \frac{1}{l} \times \frac{T}{2} = \frac{T}{2l} \quad (9)$$

Now, the maximum effective width T of the imaging optical system 105 in the second direction is the maximum width of the region which imaging optical fluxes pass through at the light-emitting points in the second direction. The maximum effective width T of the imaging optical system 105 in the second direction is equal to the aperture width (aperture size) in the second direction of the lens optical systems 105a, in a configuration where only one lens row is arrayed in the second direction, as with the imaging optical system 105 according to the present embodiment.

Expression (5) can be transformed as Expression (10) by Expressions (8) and (9).

[Math. 10]

$$0.8 \leq \frac{P_m}{P_s} \frac{1 - P_s D_s}{1 - P_m D_m} \frac{n_m p}{T} \leq 1.2 \quad (10)$$

The array pitch p, the maximum number $n_m$ of lens optical systems 105a through which light rays from one light-emitting point pass, and the maximum effective width T of the imaging optical system 105 in the second direction, are set with the present embodiment so as to satisfy Expression (10). Thus, the depth of field in the X-Y cross-section and in the Z-X cross-section can be made approximately equal. Further, satisfying the next Expression (11) is even more preferable, in order to suppress reduction in stability of imaging capabilities to 15%.

[Math. 11]

$$0.85 \leq \frac{P_m}{P_s} \frac{1 - P_s D_s}{1 - P_m D_m} \frac{n_m p}{T} \leq 1.15 \quad (11)$$

The array pitch p of the lens optical systems 105a is 0.77 mm in the present embodiment, and the maximum effective width T of the imaging optical system 105 in the second direction is 2.44 mm, which is equal to the aperture size of the lens optical system 105a. Also, the maximum number $n_m$ of lens optical systems 105a through which light rays from one light-emitting point pass is two, taking into consideration light rays from light-emitting points at intermediate object height where depth of field is minimal. The values of $P_i$ and $D_i$ are as described above. Substituting these values into the middle member of Expression (10) yields the following Expression (12), so it can be seen that conditional Expressions (10) and (11) are satisfied.

[Math. 12]

$$\frac{P_m}{P_s} \frac{1 - P_s D_s}{1 - P_m D_m} \frac{n_m p}{T} = 0.88 \quad (12)$$

The values of the middle member differ slightly between Expressions (12) and (7), but this is because Expression (8) includes approximation, and there is no difference in the fundamental idea.

As described above, the lens optical systems of the lens optical systems of the optical apparatus according to the present embodiment are designed so as to satisfy Expressions (5) or (6), or Expressions (10) or (11). Thus, the depth of field at the time of light-emitting points at intermediate object height being imaged on the light-receiving surface 106 is approximately equal in the X-Y cross-section and in the Z-X cross-section, thereby achieving good imaging capabilities while securing light available efficiency.

Second Embodiment

Next, an optical apparatus according to a second embodiment of the present invention will be described in detail. Components which are the same as or equivalent to those in the first embodiment will be denoted with the same reference numerals, and description thereof simplified or omitted.

The present embodiment differs from the first embodiment with regard to the size of each of the light-emitting points of the light source 101, and the aperture size of the lens portion which the imaging unit 104 has, in the Z-X cross-section. Specifically, the optical apparatus according to the present embodiment is of a configuration where the size of the light-emitting points of the light source is equal in the X-Y cross-section and in the Z-X cross-section, i.e., the resolution in both cross-sections is equal, and also the aperture size $A_s$ of the lens portion at the imaging unit 104 is changed as compared to that in the first embodiment.

At this time, the imaging optical system 105 according to the present embodiment is of a configuration to perform same-size imaging in the X-Y cross-section and in the Z-X cross-section, so the size of the image formed on the light-receiving surface 106 by light rays from each of the light-emitting points is the same in the X-Y cross-section and in the Z-X cross-section. That is to say, $D_m = D_s$ holds, and also $P_m = P_s$ holds, so the above-described conditional Expression (5) and Expression (10) are as in the following Expressions (13) and (14).

[Math. 13]

$$0.8 \leq \frac{\tan\theta_m}{\tan\theta_s} \leq 1.2 \quad (13)$$

[Math. 14]

$$0.8 \leq \frac{n_m p}{T} \leq 1.2 \quad (14)$$

The aperture size $A_s$ in the second direction at the imaging units, i.e., the maximum effective width T of the imaging optical system 105 in the second direction, is 1.70 mm in the present embodiment. Accordingly, the maximum value of the maximum half-value $\theta_s$ of the angle of divergence of the imaging optical flux in the Z-X cross-section, at the time of input of light rays from light-emitting points at intermediate object height to the light-receiving surface 106, is 15.07 degrees. At this time, the other values, such as the maximum number $n_m$ of lens optical systems 105a through which light rays from one light-emitting point pass, are unchanged from the first embodiment. Accordingly, substituting these values into the middle member of Expressions (13) and (14) yields the following Expressions (15 and 16), and it can be seen that the conditional Expressions (13) and (14) are satisfied.

[Math. 15]

$$\frac{\tan\theta_m}{\tan\theta_s} = 0.89 \quad (15)$$

[Math. 16]

$$\frac{n_m p}{T} = 0.91 \quad (16)$$

Figure 6A:
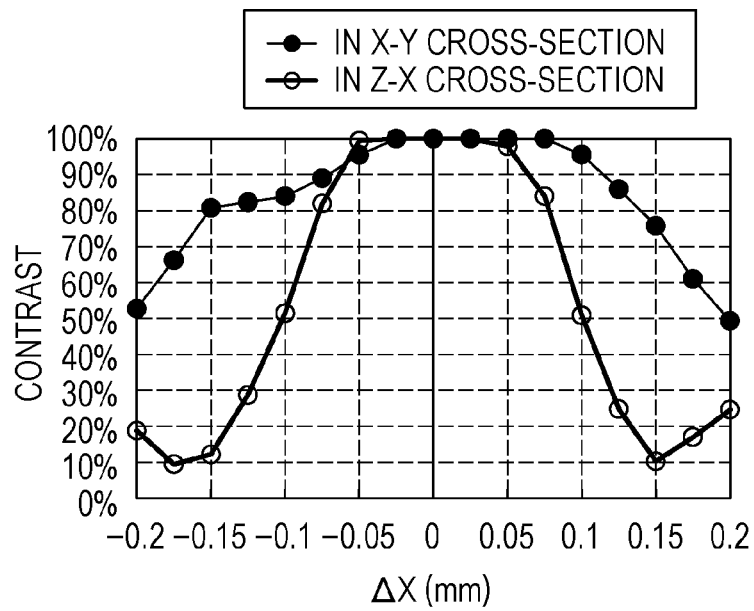
FIGS. 6A and 6B are diagrams illustrating depth of field properties of an imaging optical system according to a second embodiment.
Figure 6B:
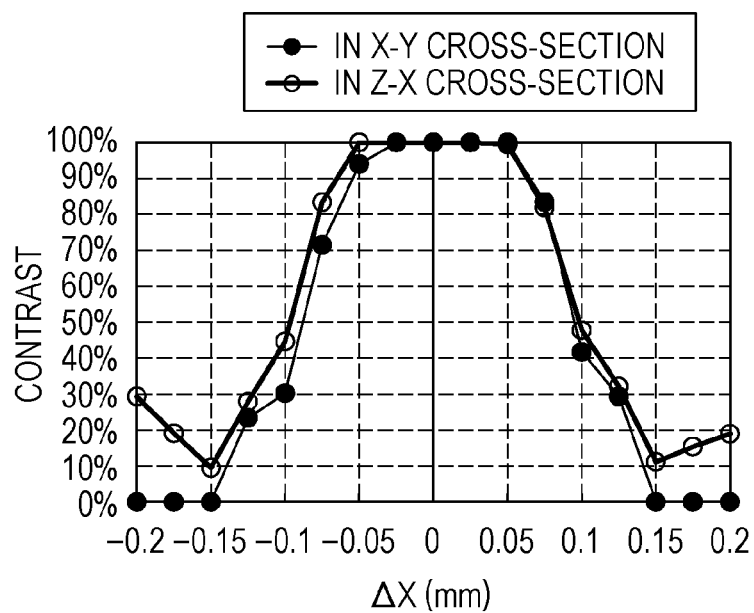

FIGS. 6A and 6B are diagrams illustrating depth properties of the imaging optical system 105 according to the present embodiment in the X-Y cross-section and in the Z-X cross-section, in the same way as with FIGS. 5A and 5B. FIG. 6A illustrates the relationship between depth of field of light rays from a light-emitting point at axial object height, and contrast, and in the same way as with FIG. 5A, the depth of field in the X-Y cross-section is greater than the depth of field in the Z-X cross-section at each contrast value. On the other hand, FIG. 6B illustrates that the depth of field in the X-Y cross-section and in the Z-X cross-section is approximately equal, due to the relationship between depth of field and contrast, with regard to light rays from a light-emitting point at intermediate object height.

Table 3 illustrates the depth of field for each of in the X-Y cross-section and in the Z-X cross-section for each contrast and the ratio thereof, when a light-emitting point at intermediate object height is imaged on the light-receiving surface 106.

TABLE 3

| Contrast | Δxm | Δxs | Δxm/Δxs |
|---|---|---|---|
| 100% | 0.086 | 0.105 | 1.16 |
| 90% | 0.119 | 0.128 | 1.07 |
| 80% | 0.143 | 0.153 | 1.08 |
| 70% | 0.159 | 0.167 | 1.07 |
| 60% | 0.171 | 0.181 | 1.09 |
| 50% | 0.183 | 0.195 | 1.11 |
| 40% | 0.198 | 0.219 | 1.13 |

Table 3 shows that the depth of field is approximately equal in the X-Y cross-section and in the Z-X cross-section, in the contrast range of 40 to 90%. Thus it has been demonstrated that the optical apparatus according to the present embodiment can make the depth of field in the X-Y cross-section and in the Z-X cross-section to be the same when a light-emitting point at intermediate object height is being imaged on the light-receiving surface 106, by being configured so as to satisfy conditional Expression (5) and conditional Expression (10).

Thus, good imaging capabilities can be achieved while securing light available efficiency with the optical apparatus according to the present embodiment, regardless of parameter values such as light-emitting point size and so forth.

Third Embodiment

Next, an optical apparatus according to a third embodiment of the present invention will be described in detail. Components which are the same as or equivalent to those in the first embodiment will be denoted with the same reference numerals, and description thereof simplified or omitted.

The present embodiment differs from the first embodiment with regard to the values of the maximum object height L regarding which one lens optical system can take in light rays, and the array pitch p of the imaging optical system. Properties of the imaging optical system according to the present embodiment are shown in Table 4.

TABLE 4

| | | | Aspheric form | | | | | | |
|---|---|---|---|---|---|---|---|---|---|
| Configuration | | | Lens surface 702a | | Lens surface 702b | | Lens surface 704b | | Lens surface 704a |
| Resolution | dpi | 600 | | | | | | | |
| Wavelength | λ(nm) | 620 | R | 0 | R | 0 | R | 0 | R | 0 |
| Refractive index | n(λ = 620 nm) | 1.534 | k | 0 | k | 0 | k | 0 | k | 0 |
| F-No. in first direction of lens unit | Fno_m | 3.90 | A20 | 0.50277 | A20 | −0.82549 | A20 | 0.82549 | A20 | −0.50277 |
| F-No. in second direction of lens unit | Fno_s | 1.30 | A40 | −0.51259 | A40 | 0.29164 | A40 | −0.29164 | A40 | 0.51259 |
| Power in first direction of lens unit | βm | −0.45 | A60 | −0.24716 | A60 | −0.55971 | A60 | 0.55971 | A60 | 0.24716 |
| Array pitch in first direction of lens unit | p(mm) | 0.76 | A80 | 0.08357 | A80 | −0.01894 | A80 | 0.01894 | A80 | −0.08357 |

TABLE 4-continued

| Configuration | | | Aspheric form | | | | | | | |
|---|---|---|---|---|---|---|---|---|---|---|
| | | | Lens surface 702a | | Lens surface 702b | | Lens surface 704b | | Lens surface 704a | |
| Resolution | dpi | 600 | | | | | | | | |
| Number of optical systems arrayed in first direction of lens unit | Nm(count) | 291 | A100 | −6.91825 | A100 | −0.78249 | A100 | 0.78249 | A100 | 6.91825 |
| Number of optical systems arrayed in second direction of lens unit | Ns(count) | 1 | A02 | 0.15643 | A02 | −0.19504 | A02 | 0.19504 | A02 | −0.15643 |
| Maximum object height of which lens unit can intake light | L(mm) | 0.873 | A22 | −0.15873 | A22 | 0.09481 | A22 | −0.09481 | A22 | 0.15873 |
| size of light-emitting point in first direction | Dm(um) | 42.30 | A42 | −0.15055 | A42 | −0.30023 | A42 | 0.30023 | A42 | 0.15055 |
| size of light-emitting point in second direction | Ds(um) | 25.40 | A62 | 5.65920 | A62 | 3.06561 | A62 | −3.06561 | A62 | −5.65920 |
| Aperture size | | | A82 | −13.83601 | A82 | −6.53977 | A82 | 6.53977 | A82 | 13.83601 |
| Aperture size in first direction of imaging unit 702 | Am1(mm) | 0.76 | A04 | −0.03679 | A04 | −0.00756 | A04 | 0.00756 | A04 | 0.03679 |
| Aperture size in second direction of imaging unit 702 | As1(mm) | 244 | A24 | 0.14799 | A24 | 0.03211 | A24 | −0.03211 | A24 | −0.14799 |
| Aperture size in first direction of imaging unit 704 | Am2(mm) | 0.76 | A44 | −1.03706 | A44 | −0.59005 | A44 | 0.59005 | A44 | 1.03706 |
| Aperture size in second direction of imaging unit 704 | As2(mm) | 2.44 | A64 | −1.89450 | A64 | −0.69876 | A64 | 0.69876 | A64 | 1.89450 |
| Placement | | | A06 | 0.01270 | A06 | 0.00111 | A06 | −0.00111 | A06 | −0.01270 |
| Distance between light source 701 and lens surface 702a | d1(mm) | 2.65 | A26 | −0.07715 | A26 | −0.00101 | A26 | 0.00101 | A26 | 0.07715 |
| Distance between lens surface 702a and lens surface 702b | d2(mm) | 1.25 | A46 | 0.97142 | A46 | 0.41327 | A46 | −0.41327 | A46 | −0.97142 |
| Distance between lens surface 702b and lens surface 704a | d3(mm) | 2.16 | A08 | −0.00611 | A08 | −0.00105 | A08 | 0.00105 | A08 | 0.00611 |
| Distance between lens surface 704a and lens surface 704b | d4(mm) | 1.25 | A28 | −0.01342 | A28 | −0.01827 | A28 | 0.01827 | A28 | 0.01342 |
| Distance between lens surface 704b and light-receiving surface 706 | d5(mm) | 2.65 | A010 | 0.00128 | A010 | 0.00010 | A010 | −0.00010 | A010 | −0.00128 |

First, the behavior of each light-emitting point of a light source 701 being imaged on a light-receiving surface 706 by an imaging optical system 705 in the X-Y cross-section will be described with reference to FIGS. 7A and 7B.

Figure 7A:
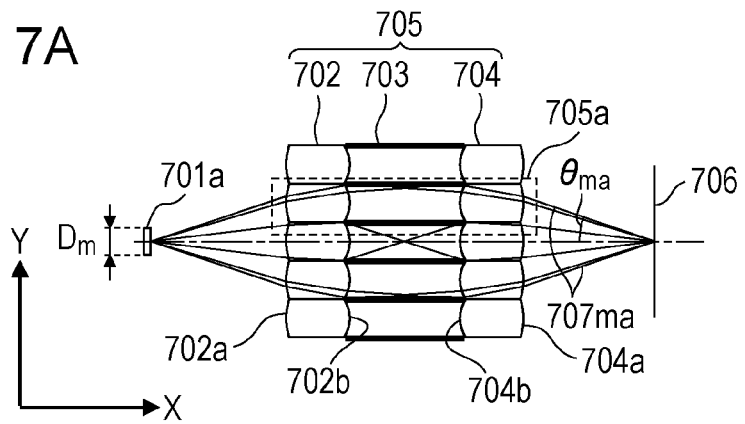
FIGS. 7A through 7D are diagrams illustrating the way in which light-emitting points according to a third embodiment are imaged.

FIG. 7A is a diagram illustrating the way in which a light-emitting point 701a at axial object height is imaged at the light-receiving surface 706 in the X-Y cross-section. Light rays emitted from the light-emitting point 701a are temporarily condensed at the intermediate imaging plane A by way of the imaging unit 702, and subsequently condensed on the light-receiving surface 706 by way of the imaging unit 704. At this time, the light rays emitted from the light-emitting point 701a passes through three lens portions at each of the imaging units 702 and 704. That is to say, the number of lens optical systems 705a which the light rays emitted from the light-emitting point at axial object height pass through is three. It can be seen from FIG. 7A that a great part of the light rays is input to the lens optical system 705a at the middle (i.e., on the axis where the light-emitting point 701a is situated), while the amount of light rays input to the two lens optical systems 705a on either side of this lens optical system 705a is scant.

Figure 7B:
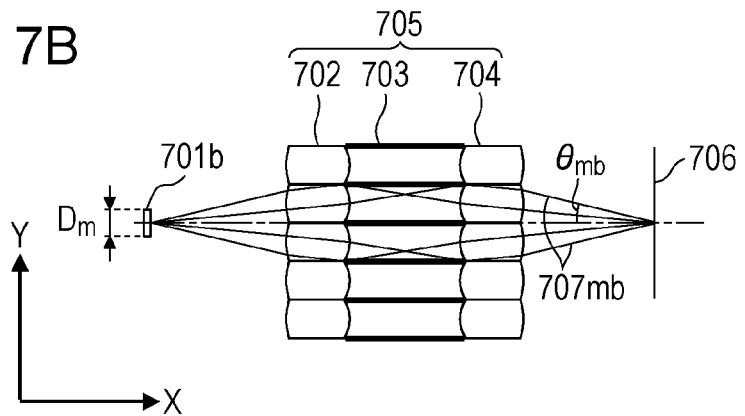

On the other hand, FIG. 7B is a diagram illustrating the way in which a light-emitting point 701b at intermediate object height is imaged on the light-receiving surface 706 in the X-Y cross-section. Light rays emitted from the light-emitting point 701b are temporarily condensed at the intermediate imaging plane A by way of the imaging unit 702, in the same way as with light rays emitted from the light-emitting point 701a, and subsequently condensed on the light-receiving surface 706 by way of the imaging unit 704. At this time, the light rays emitted from the light-emitting point 701b pass through two lens portions at each of the imaging units 702 and 704. That is to say, the number of lens optical systems 705a which the light rays emitted from the light-emitting point at intermediate object height pass through is two.

Next, the behavior of each light-emitting point of the light-emitting point 701a and light-emitting point 701b being imaged on the light-receiving surface 706 by the imaging optical system 705 in the Z-X cross-section section will be described with reference to FIGS. 7C and 7D.

Figure 7C:
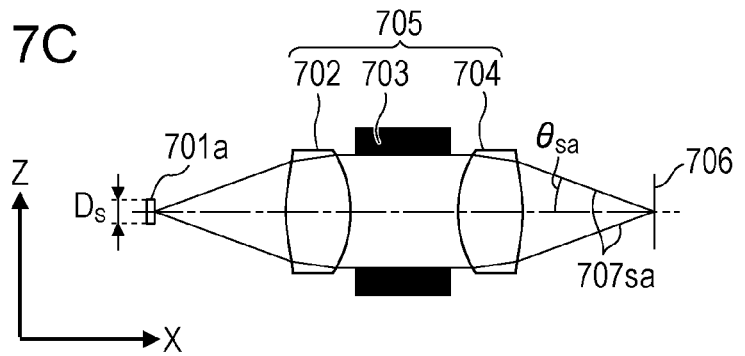

Light rays emitted from the light-emitting point 701a become approximately parallel light by way of the imaging unit 702, and then are input to the imaging unit 704 and condensed on the light-receiving surface 706, as illustrated in FIG. 7C. The imaging optical system 705 here is an inverted same-size imaging system in the Z-X cross-section, so the number of lens rows of the lens optical system 705a which light rays emitted from the light-emitting point 701a pass through is the number of lens rows in the second direction. In the present embodiment, the number of lens rows in the second direction is one row, so light rays emitted from the light-emitting point 701a only pass through one lens optical system 705a. Note that the half-value of the incident angle of an extreme periphery light ray 707sa of the light rays passing through that lens optical system 705a when entering the light-receiving surface 706, i.e., the half-value of the angle of divergence of the imaging optical flux of the light rays emitted from the light-emitting point 701a, is $\theta_{sa}$ of 20.27 degrees.

Figure 7D:
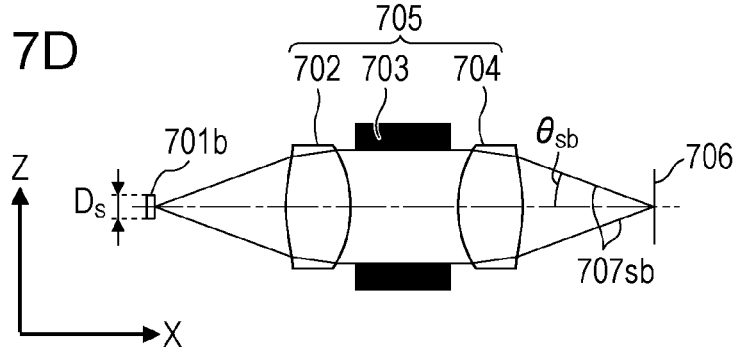

Also, light rays emitted from the light-emitting point 701b become approximately parallel light by way of the imaging unit 702, and then are input to the imaging unit 704 and condensed on the light-receiving surface 706, as illustrated in FIG. 7D. Accordingly, light rays emitted from the light-emitting point 701b also only pass through one lens optical system 705a, in the same way as with light rays emitted from the light-emitting point 701a. Note that the half-value of the incident angle of an extreme periphery light ray 707sb of the light rays passing through that lens optical system 705a when entering the light-receiving surface 706, i.e., the half-value of the angle of divergence of the imaging optical flux of the light rays emitted from the light-emitting point 701b, is $\theta_{sb}$ of 20.27 degrees, the same as with $\theta_{sa}$.

Now, let us calculate the maximum number of lens optical systems 705a through which light rays from one light-emitting point pass. In the present embodiment, the maximum object height L regarding which one lens optical system 705a can take in light rays is 0.87 mm, and the array pitch p of lens optical systems 705a is 0.76. At this time, $n_m$ (the maximum number of lens optical systems 705a through which light rays from one light-emitting point pass in the X-Y cross-section)=1+integer portion (2×L/p)=3. Note that $n_m$ is an odd number, so the half-value $\theta_{ms}$ of the angle of divergence is the maximum (maximum value) when an imaging optical flux from a light-emitting point at intermediate object height is input to the light-receiving surface 706. Accordingly, the half-value of the incident angle of an extreme periphery light ray 707ma of the light rays passing through three lens optical systems 705a in X-Y cross-section, when entering the light-receiving surface 706, is $\theta_{ma}$ of 20.06 degrees, which is the half-value of the angle of divergence of the imaging optical flux.

On the other hand, as described above, the maximum number of lens optical systems 705a through which light rays from one light-emitting point pass in the Z-X cross-section is $n_s$ of one, and the half-value of the angle of divergence of the imaging optical flux in X-Y cross-section, is $\theta_s$ of 20.27 degrees. Also, the aperture size $A_s$ of the imaging units in the second direction, i.e., the maximum effective width T of the imaging optical system 705 in the second direction is 2.44 mm.

Substituting these values into the middle member of Expressions (5) and (10) yield the following Expressions (17) and (18).

[Math. 17]

$$\frac{P_m}{P_s} \frac{1 - P_s D_s}{1 - P_m D_m} \frac{\tan\theta_m}{\tan\theta_s} = 1.38 \qquad (17)$$

[Math. 18]

$$\frac{P_m}{P_s} \frac{1 - P_s D_s}{1 - P_m D_m} \frac{n_m p}{T} = 1.31 \qquad (18)$$

That is, it can be seen that the values of Expressions (17) and (18) do not satisfy Expressions (5) and (10).

Figure 8A:
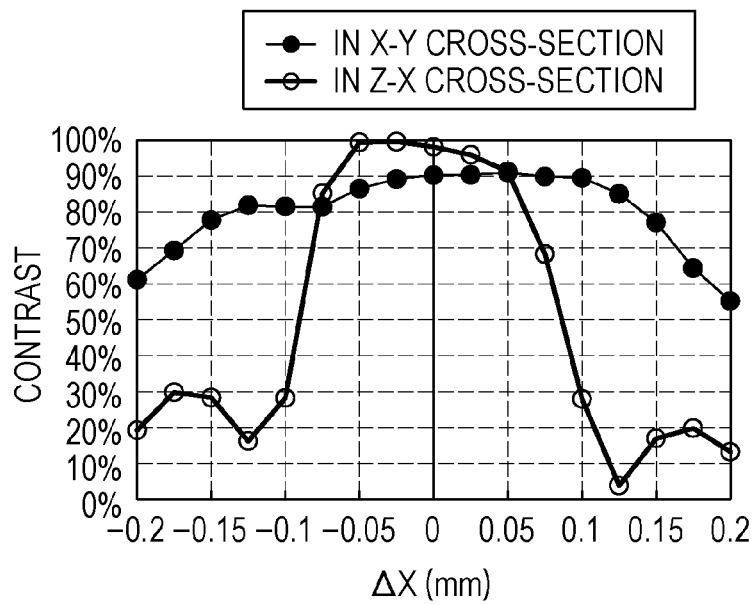
FIGS. 8A and 8B are diagrams illustrating depth of field properties of an imaging optical system according to the third embodiment.
Figure 8B:
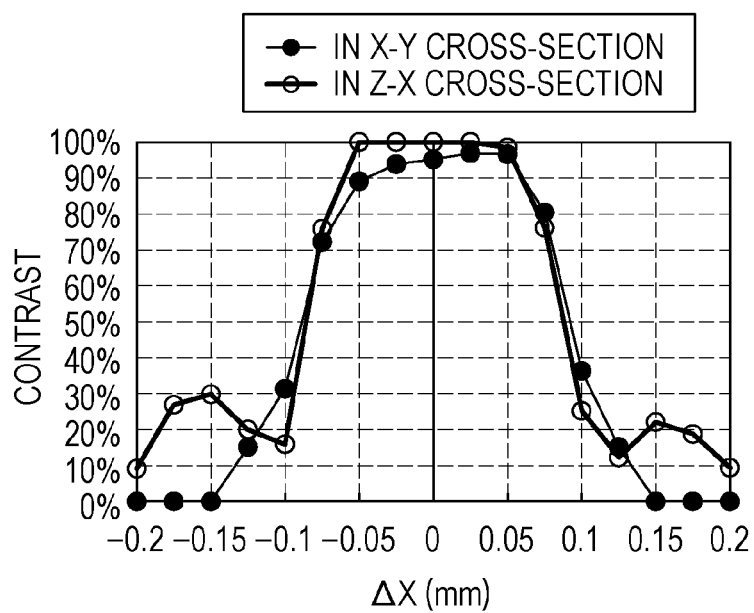

FIGS. 8A and 8B are diagrams illustrating depth properties of the imaging optical system 705 according to the present embodiment in the X-Y cross-section and in the Z-X cross-section, the same as with FIGS. 5A and 5B. FIG. 5A illustrates the relationship between depth of field and contrast when a light-emitting point at axial object height is imaged on the light-receiving surface 706, and in the same way as with the case of FIG. 5A, the depth of field in the X-Y cross-section is greater than the depth of field in the Z-X cross-section at each contrast value. On the other hand, FIG. 8B illustrates that the depth of field in the X-Y cross-section and in the Z-X cross-section are generally the same, due to the relationship between depth of field and contrast when a light-emitting point at intermediate object height is imaged on the light-receiving surface 706.

Table 5 illustrates the depth of field for each of in the X-Y cross-section and in the Z-X cross-section for each contrast and the ratio thereof, when a light-emitting point at intermediate object height is imaged on the light-receiving surface 706.

TABLE 5

| Contrast | Δxm | Δxs | Δxm/Δxs |
|----------|-------|-------|---------|
| 100%     | —     | 0.103 | —       |
| 90%      | 0.105 | 0.120 | 1.12    |
| 80%      | 0.139 | 0.141 | 1.01    |
| 70%      | 0.157 | 0.155 | 0.98    |
| 60%      | 0.169 | 0.165 | 0.98    |
| 50%      | 0.181 | 0.174 | 0.98    |
| 40%      | 0.193 | 0.183 | 0.97    |

Table 5 shows that the depth of field in the X-Y cross-section and in the Z-X cross-section is made approximately equal within the range of contrast of 40 through 90%, even though the values of Expressions (17) and (18) do not satisfy the conditional Expressions (5) and (10).

The reason is that the conditional Expressions (5) and (10) derived assuming depth of field at contrast of 100% were used by approximating as conditional expression assuming depth of field at contrast of 40 to 80%. In the first and second embodiments, the conditional Expressions (5) and (10) could be used approximatively, even in the case of evaluating at contrast of 40 to 80%. However, in a case where that approximation cannot be applied and Expressions (5) and (10) cannot be used, expressions equivalent to Expressions (5) and (10) need to be created assuming a case of performing evaluation with depth of field at contrast of 40% to 80%.

Let us consider the reason that Expressions (5) and (10) cannot be used in a case of evaluating with depth of field at contrast of 40% to 80% in the present embodiment. Light rays from axial object height pass through three lens optical systems 705a in the present embodiment. As can be seen from FIG. 7A, of the three lens optical systems 705a, light rays passing through the two lens optical systems 705a on the sides are very scant, and almost all of the light rays pass through the one lens optical system 705a at the middle. Accordingly, a $\Delta x_i'$ taking into consideration contrast of 40 to 80% (tolerance range of two adjacent light-emitting points overlapping) has to be set as to light rays passing through the lens optical systems 705a on the sides.

Figure 9:
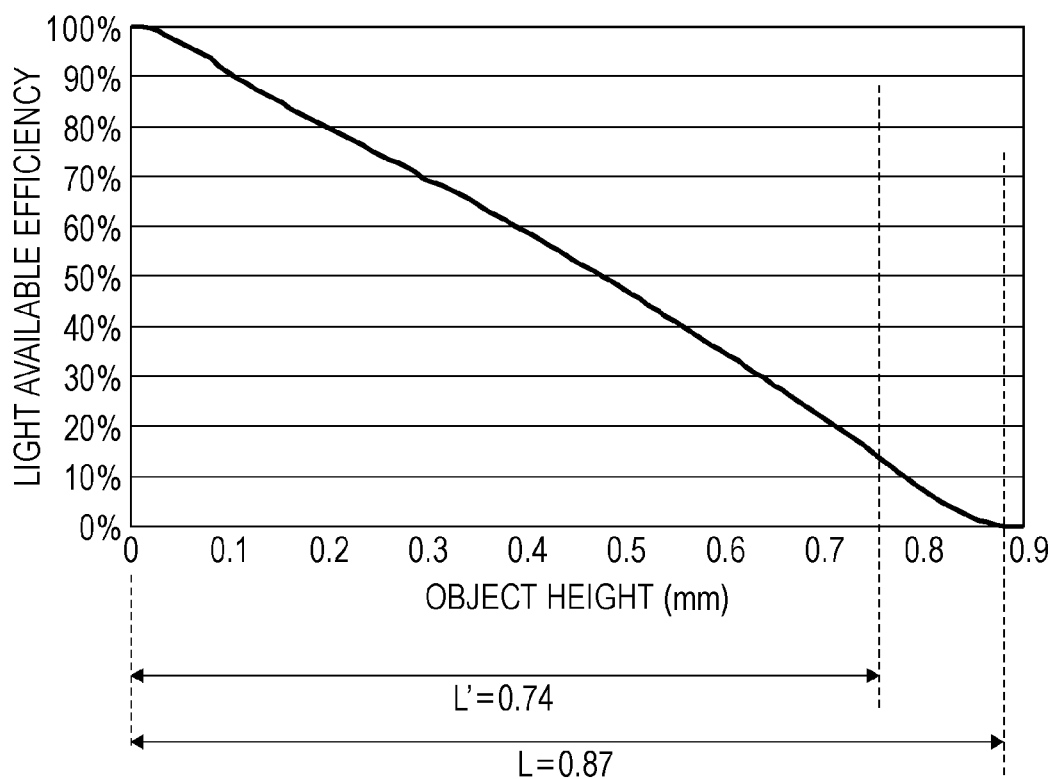
FIG. 9 is a diagram illustrating the relationship between object height and light available efficiency of a lens optical system according to the third embodiment.

FIG. 9 illustrates the relation between object height as to a certain lens optical system 705a of the imaging optical system 705, and light available efficiency. As can be seen from FIG. 9, the amount of light which can be taken in increases as the object height where the light-emitting point is situated increases, and light rays cannot be taken in from an object height greater than the maximum object height L. Now, in a case of defining $\Delta x_i$ assuming contrast of 100%, an object height where the light rays taken into the lens optical system 705a are scant, also has to be taken into consideration. However, in a case of defining $\Delta x_i'$ assuming contrast of 40 to 80%, the lens optical system 705a has to be deemed to not take in light rays with regard to an object height of which the amount of light is not greater than a predetermined amount.

Accordingly, an effective maximum object height (a valid maximum object height) L' at which one lens optical system 705a can take in light rays, when assuming contrast of 40 to 80%, is defined with the present embodiment. The $\Delta x_i'$ is then defined from $n_i'$ which is the maximum effective number (valid number) of lens optical systems 705a through which light rays for the object heights at or lower than the effective maximum object height L', and the half-value $\theta_i'$ of the effective angle (valid angle) of diversion of the imaging optical flux from each object height at or lower than the effective maximum object height L'.

In a case of assuming contrast of 40 to 80%, the present inventor has found from experience that an effective maximum object height L'=0.85 L can be defined as a general rule, when taking into consideration the light rays contributing to imaging. With the present embodiment, the object height L'=0.85×0.87=0.74 mm, so $n_m'$ (the maximum effective number of lens optical systems 705a through which light rays from one light-emitting point pass in the X-Y cross-section)=1+integer portion (2×0.85 L/p)=2. Note that $n_m'$ is an even number, so the half-value $\theta_m'$ of the angle of divergence is the maximum (maximum value) when an imaging optical flux from a light-emitting point at intermediate object height is input to the light-receiving surface 706. Accordingly, the half-value of the maximum value of the effective angle of divergence of the imaging optical flux in X-Y cross-section is $\theta_m'$ of 13.98 degrees.

On the other hand, as described above, the maximum effective number of lens optical systems 705a through which light rays from one light-emitting point pass in the Z-X cross-section is $n_s'$ of one, and the half-value of the maximum effective angle of divergence of the imaging optical flux is $\theta_s'$ of 21.31 degrees. Also, the aperture size $A_s$ of the imaging units in the second direction, i.e., the maximum effective width T of the imaging optical system 705 in the second direction is 2.44 mm. Replacing the angle of divergence $\theta_i$ with the effective angle of divergence $\theta_i'$, and replacing the maximum number $n_m$ with the maximum effective number $n_m'$, and substituting these values into the middle member of Expression (10) yield the following Expressions (19) and (20), so we can see that condition Expressions (5) and (10) are satisfied.

[Math. 19]

$$\frac{P_m}{P_s}\frac{1-P_sD_s}{1-P_mD_m}\frac{\tan\theta_m}{\tan\theta_s}=0.89 \quad (19)$$

[Math. 20]

$$\frac{P_m}{P_s}\frac{1-P_sD_s}{1-P_mD_m}\frac{n_m p}{T}=0.87 \quad (20)$$

Thus, with the optical apparatus according to the present embodiment, good imaging capabilities can be achieved while securing light available efficiency, by performing settings taking into consideration the effective angle of divergence $\theta_i'$ or maximum effective number $n_m'$, assuming contrast of 40 to 80%.

Fourth Embodiment

Next, an optical apparatus according to a fourth embodiment of the present invention will be described in detail. Components which are the same as or equivalent to those in the first embodiment will be denoted with the same reference numerals, and description thereof simplified or omitted. The present embodiment differs from the first embodiment in that each lens optical system is an enlarging optical system in Z-X cross-section, and the light-emitting point size in Z-X cross-section and the image on the light-receiving surface are not the same size.

Figure 10A:
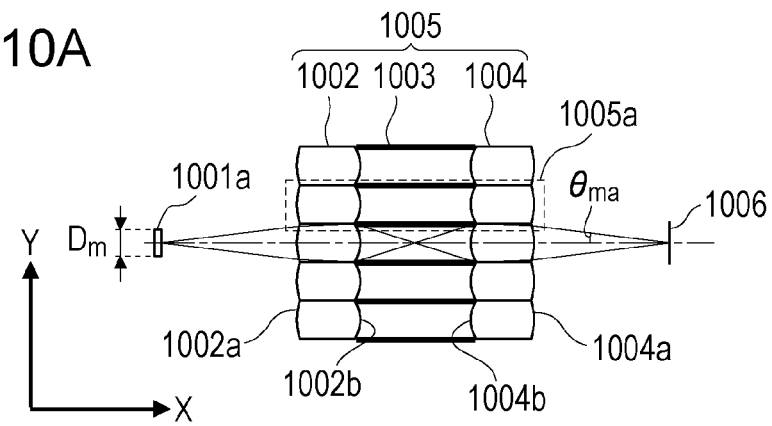
FIGS. 10A through 10D are diagrams illustrating the way in which light-emitting points according to a fourth embodiment are imaged.
Figure 10B:
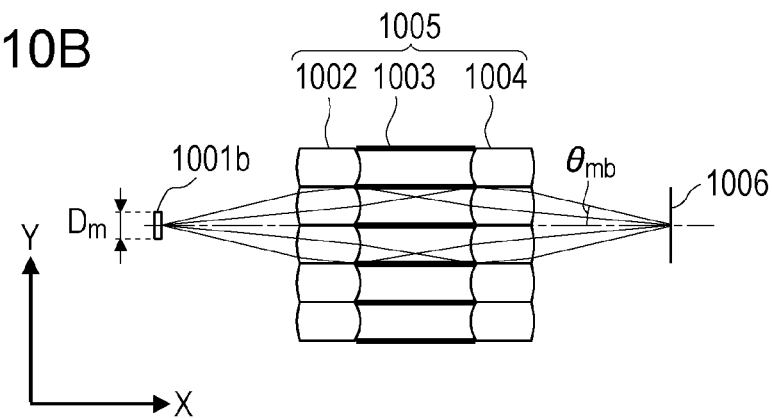
Figure 10C:
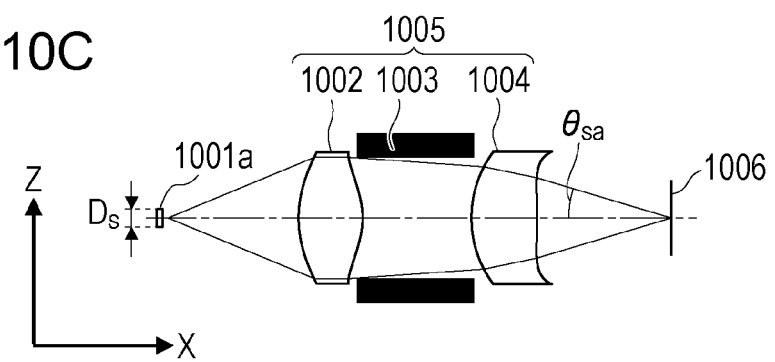
Figure 10D:
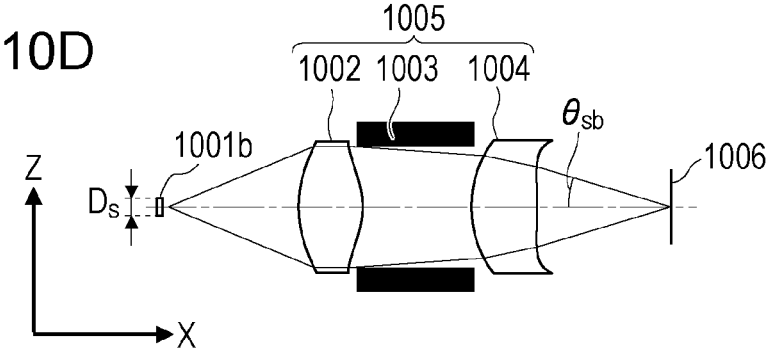

FIGS. 10A through 10D are schematic diagrams of principal portions of an optical apparatus according to the present embodiment, with FIGS. 10A and 10B illustrating the X-Y cross-section, and FIGS. 10C and 10D illustrating the Z-X cross-section. The optical apparatus according to the present embodiment includes a light source 1001 including multiple light-emitting points arrayed on an object plane, and an imaging optical system 1005 which condenses multiple light rays emitted from the light source 1001 upon a light-receiving surface (image plane) 1006.

The imaging optical system 1005 is a lens array including multiple lens optical systems 1005a arrayed in the first direction, and shielding portions 1003 to shield stray light rays. The optical systems 1005a include imaging units 1002 and 1004 disposed on the same optical axis. Note that unlike the first embodiment, the lens portions making up the imaging unit 1002 and the lens portions making up the imaging unit 1004 are of different shapes. Thus, the imaging optical system 1005 according to the present embodiment has an enlarging system in the Z-X cross-section. Lens surfaces 1002a and 1002b, of the imaging unit 1002, and 1004a and 1004b, of the imaging unit 1004 all have anamorphic aspheric forms (anamorphic surfaces). The aspheric forms thereof are expressed in Expression (1) described above.

Properties of the imaging optical system 1005 according to the present embodiment are shown in Table 6.

TABLE 6

| | | | Aspheric form | | | | | | | |
|---|---|---|---|---|---|---|---|---|---|---|
| Configuration | | | Lens surface 1002a | | Lens surface 1002b | | Lens surface 1004b | | Lens surface 1004a | |
| Resolution | dpi | 600 | | | | | | | | |
| Wavelength | λ(nm) | 780 | R | 0 | R | 0 | R | 0 | R | 0 |
| Refractive index | n(λ = 780 nm) | 1.486 | k | 0 | k | 0 | k | 0 | k | 0 |
| F-No. in first direction of lens unit | Fno_m | 3.90 | A20 | 0.49353 | A20 | −0.84151 | A20 | 0.84151 | A20 | −0.49353 |
| F-No. in second direction of lens unit | Fno_s | 1.30 | A40 | −0.51152 | A40 | 0.29629 | A40 | −0.29629 | A40 | 0.51152 |
| Power in first direction of lens unit | βm | −0.45 | A60 | −0.58605 | A60 | −0.45822 | A60 | 0.45822 | A60 | 0.58605 |
| Array pitch in first direction of lens unit | p(mm) | 0.77 | A80 | 0.55114 | A80 | −2.30492 | A80 | 2.30492 | A80 | −0.55114 |

TABLE 6-continued

| Configuration | | | Aspheric form | | | | | | | |
|---|---|---|---|---|---|---|---|---|---|---|
| | | | Lens surface 1002a | | Lens surface 1002b | | Lens surface 1004b | | Lens surface 1004a | |
| Resolution | dpi | 600 | | | | | | | | |
| Number of optical systems arrayed in first direction of lens unit | Nm(count) | 291 | A100 | −6.18001 | A100 | 8.30369 | A100 | −8.30369 | A100 | 6.18001 |
| Number of optical systems arrayed in second direction of lens unit | Ns(count) | 1 | A02 | 0.20133 | A02 | −0.23125 | A02 | 0.19949 | A02 | −0.03519 |
| Maximum object height of which lens unit can intake light | L(mm) | 0.768 | A22 | −0.25709 | A22 | 0.010385 | A22 | −0.02678 | A22 | 0.14680 |
| size of light-emitting point in first direction | Dm(um) | 42.30 | A42 | 0.03333 | A42 | −0.41981 | A42 | 0.22126 | A42 | 0.28788 |
| size of light-emitting point in second direction | Ds(um) | 25.40 | A62 | 5.65825 | A62 | 3.25668 | A62 | −1.32747 | A62 | −2.40382 |
| Aperture size | | | A82 | −11.79314 | A82 | −6.03053 | A82 | 1.49199 | A82 | 23.62346 |
| Aperture size in first direction of imaging unit 1002 | Am1(mm) | 0.7 | A04 | −0.02012 | A04 | 0.00680 | A04 | 0.00382 | A04 | 0.01535 |
| Aperture size in second direction of imaging unit 1002 | As1(mm) | 244 | A24 | 0.16833 | A24 | 0.01902 | A24 | −0.07111 | A24 | −0.19636 |
| Aperture size in first direction of imaging unit 1004 | Am2(mm) | 0.7 | A44 | −0.85689 | A44 | −0.32633 | A44 | 0.61214 | A44 | 1.36064 |
| Aperture size in second direction of imaging unit 1004 | As2(mm) | 2.44 | A64 | −2.75367 | A64 | −1.71326 | A64 | 0.10789 | A64 | −5.64660 |
| Placement | | | A06 | 0.01283 | A06 | 0.00356 | A06 | 0.00032 | A06 | −0.00686 |
| Distance between light source 1001 and lens surface 1002a | d1(mm) | 2.62 | A26 | −0.02314 | A26 | −0.01182 | A26 | −0.01030 | A26 | 0.05265 |
| Distance between lens surface 1002a and lens surface 1002b | d2(mm) | 1.27 | A46 | 0.69981 | A46 | 0.41193 | A46 | −0.62041 | A46 | −2.47916 |
| Distance between lens surface 1002b and lens surface 1004a | d3(mm) | 2.16 | A08 | 0.00714 | A08 | 0.00306 | A08 | −0.00070 | A08 | −0.01322 |
| Distance between lens surface 1004a and lens surface 1004b | d4(mm) | 1.27 | A28 | −0.00717 | A28 | 0.02039 | A28 | 0.02811 | A28 | −0.01344 |
| Distance between lens surface 1004b and light-receiving surface 1006 | d5(mm) | 2.62 | A010 | −0.00170 | A010 | 0.00340 | A010 | 0.00348 | A010 | 0.02919 |

FIG. 10A is a diagram illustrating the way in which a light-emitting point 1001a at axial object height in the X-Y cross-section is imaged on the light-receiving surface 1006 by the imaging optical system 1005. FIG. 10B is a diagram illustrating the way in which a light-emitting point 1001b at intermediate object height in X-Y cross-section is imaged on the light-receiving surface 1006. Light rays emitted from the light-emitting points 1001a and 1001b are temporarily condensed at the intermediate imaging plane A by way of the imaging unit 1002, and subsequently condensed on the light-receiving surface 1006 by way of the imaging unit 1004.

With the present embodiment as well, the light rays emitted from the light-emitting point 1001a each only pass through one lens optical system 1005a, while the light rays emitted from the light-emitting point 1001b each pass through lens optical systems 1005a. The half-value of the angle of divergence of the light rays emitted from the light-emitting point 1001a is $\theta_{ma}$ of 7.31 degrees, and the half-value of the angle of divergence of the light rays emitted from the light-emitting point 1001b is $\theta_{mb}$ of 13.49 degrees. The half-value $\theta_m$ of the angle of divergence of the optical flux changes depending on the position of the light-emitting point in the X-Y cross-section, so the depth of field differs depending on the position of the light-emitting point.

On the other hand, light rays emitted from the light-emitting points 1001a and 1001b become parallel light by way of the imaging unit 1002, and then are input to the imaging unit 1004 and condensed on the light-receiving surface 1006, as illustrated in FIGS. 7C and 7D. The imaging optical system 1005 here is an inverted same-size imaging system in the Z-X cross-section, so the light rays emitted from each of the light-emitting points 1001a and 1001b only pass through one lens optical system 1005a. Note that the half-value of the angle of divergence of the imaging optical fluxes of the light rays emitted from the light-emitting points 1001a and 1001b, is $\theta_{sa}$ and $\theta_{sb}$ both of 17.23 degrees. Thus, in the Z-X cross-section, the half-value $\theta_s$ is constant regardless of the position of the light-emitting points, so the half-value of the incident angle of an imaging optical flux is also constant regardless of the position of the light-emitting points.

As described above, while the depth of field of the imaging optical system 1005 in the X-Y cross-section differs depending on the position of the light-emitting points, the depth of field in the Z-X cross-section is constant regardless of the position of the light-emitting points. Accordingly, the optical apparatus according to the present embodiment is designed such that the depth of field when light-emitting points at intermediate object height are imaged on the light-receiving surface 1006 is approximately equal in the X-Y cross-section and in the Z-X cross-section. Thus, the smallest depth of field in the X-Y cross-section and the depth of field in the Z-X cross-section can be made to be approximately equal, so imaging capabilities can be stabilized while securing maximal light.

Now, let us calculate the maximum number of lens optical systems 1005a through which light rays from one light-emitting point pass. In the present embodiment, the maximum object height L regarding which one lens optical system 105a can take in light rays is 0.768 mm, and the array pitch p of lens optical systems 7005a is 0.77 mm. At this time, $n_m$ (the maximum number of lens optical systems 1005a through which light rays from one light-emitting point pass in the X-Y cross-section)=1+integer portion (2×L/p)=2. The maximum effective number $n_m'$ taking contrast of 40 to 80% is $n_m'$=1+integer portion (2×0.85 L/p)=2. Also, $n_m$ and $n_m'$ are equal, so advantages of the present invention can be obtained with a configuration satisfying conditional Expressions (5) and (10) in both cases of taking in to consideration contrast of 100% and contrast of 40 to 80%.

In the present embodiment, $n_m$ is an even number, so the half-value $\theta_m$ of the angle of divergence is the maximum (maximum value) when an imaging optical flux from a light-emitting point at intermediate object height is input to the light-receiving surface 1006. Accordingly, the half-value of the maximum value of the incident angle of an imaging optical flux in X-Y cross-section is 13.49 degrees. On the other hand, as described above, the maximum number of lens optical systems 1005a through which light rays from one light-emitting point pass in the Z-X cross-section is $n_s$ of one, and the half-value of the maximum value of the angle of divergence of the imaging optical flux, is $\theta_s$ of 17.23 degrees. Also, the aperture size $A_s$ of the imaging units in the second direction, i.e., the maximum effective width T of the imaging optical system 1005 in the second direction is 2.44 mm.

The imaging optical system 1005 according to the present embodiment forms same-size images of each of the light-emitting points of the light source 1001 on the light-receiving surface 1006, in the X-Y cross-section and Z-X cross-section. Thus, the image size $D_m$ on the light-receiving surface 1006 in the X-Y cross-section is 42.30 µm which is equal to the size of the light-emitting points. On the other hand, the imaging optical system 1005 performs enlarged imaging of the light-emitting points of the light source 1001 by a power of 1.3, so image size $D_s$ on the light-receiving surface 1006 in the Z-X cross-section is 33.02 µm which 1.3 times the size of the light-emitting points (25.40 µm). In the same way as with the first embodiment, resolution P is evaluated as 11.81 lp/mm (equivalent to 600 dpi) in the X-Y cross-section and Z-X cross-section.

Substituting these numerical values into the middle member of conditional Expressions (5) and (10) yields Expressions (21) and (22), and we can see that conditional Expression (5) is satisfied but Expression (10) is not.

[Math. 21]

$$\frac{P_m}{P_s} \frac{1-P_sD_s}{1-P_mD_m} \frac{\tan\theta_m}{\tan\theta_s} = 0.94 \quad (21)$$

[Math. 22]

$$\frac{P_m}{P_s} \frac{1-P_sD_s}{1-P_mD_m} \frac{n_m p}{T} = 0.77 \quad (22)$$

The reason why the present embodiment does not satisfy conditional Expression (10) is that the imaging optical system 1005 according to the present embodiment is an enlarging optical system, so approximation in Expression (8) described above does not hold. In this way, conditional Expression (10) cannot be applied unless with an optical system where (8) holds.

Figure 11A:
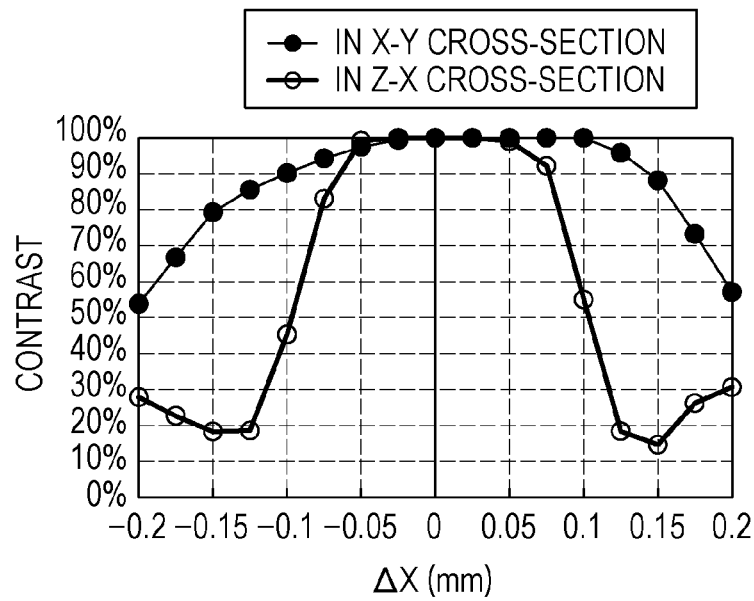
FIGS. 11A and 11B are diagrams illustrating depth of field properties of an imaging optical system according to the fourth embodiment.
Figure 11B:
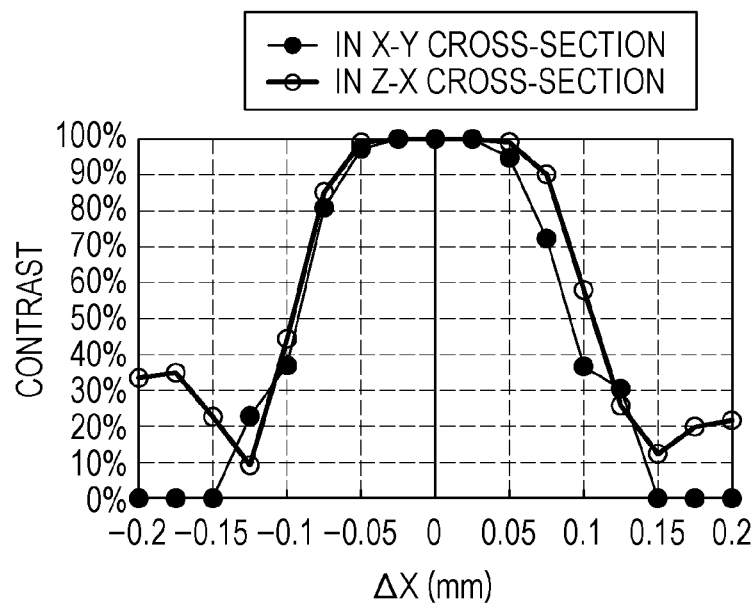

FIGS. 11A and 11B are diagrams illustrating depth of field properties of the imaging optical system 1005 according to the present embodiment in the X-Y cross-section and in the Z-X cross-section. FIG. 11A illustrates the relationship between depth of field and contrast when a light-emitting point at axial object height is imaged on the light-receiving surface 1006, and in the same way as with FIG. 5A, the depth of field in the X-Y cross-section is greater than the depth of field in the Z-X cross-section at each contrast value. On the other hand, FIG. 11B illustrates that the depth of field in the X-Y cross-section and in the Z-X cross-section is approximately equal, due to the relationship between depth of field and contrast, with regard to light rays from a light-emitting point at intermediate object height.

Table 7 illustrates the depth of field for each of in the X-Y cross-section and in the Z-X cross-section for each contrast and the ratio thereof, when a light-emitting point at intermediate object height is imaged on the light-receiving surface 1006.

TABLE 7

| Contrast | Δxm | Δxs | Δxm/Δxs |
|---|---|---|---|
| 100% | 0.077 | 0.105 | 1.37 |
| 90% | 0.116 | 0.141 | 1.21 |
| 80% | 0.142 | 0.161 | 1.13 |
| 70% | 0.158 | 0.175 | 1.10 |
| 60% | 0.170 | 0.189 | 1.10 |
| 50% | 0.183 | 0.203 | 1.09 |
| 40% | 0.196 | 0.217 | 1.10 |

Table 7 shows that the depth of field can be made approximately equal in the X-Y cross-section and in the Z-X cross-section, in the contrast range of 40 to 80%. Thus it has been demonstrated that the depth of field in the X-Y cross-section and in the Z-X cross-section can be made the same when a light-emitting point at intermediate object height is being imaged on the light-receiving surface 106, by configuring the optical apparatus according to the present embodiment so as to satisfy conditional Expression (5).

Thus, good imaging capabilities can be achieved while securing light available efficiency with the optical apparatus according to the present embodiment, even if an enlarging optical system.

Fifth Embodiment

Next, an optical apparatus according to a third embodiment of the present invention will be described in detail. Components which are the same as or equivalent to those in the first embodiment will be denoted with the same reference numerals, and description thereof simplified or omitted. The present embodiment differs from the first embodiment with regard to the point that the number of lens optical systems through which optical fluxes emitted from one light-emitting point pass is greater.

Figure 12A:
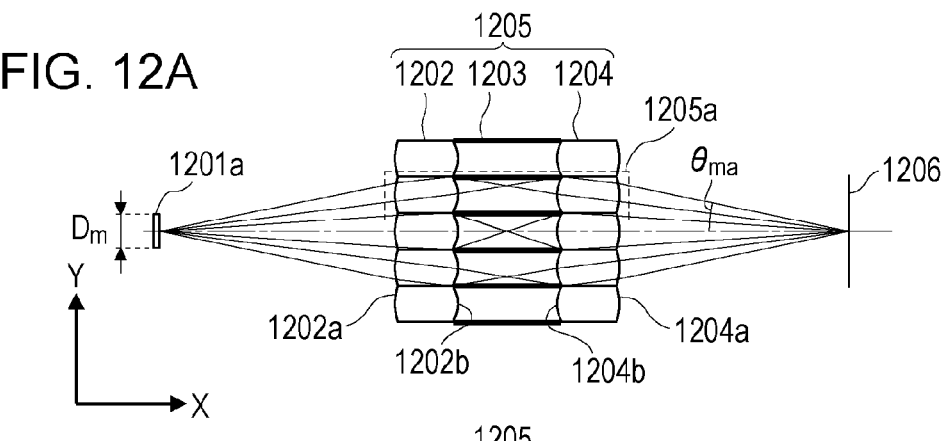
FIGS. 12A through 12D are diagrams illustrating the way in which light-emitting points according to a fifth embodiment are imaged.
Figure 12B:
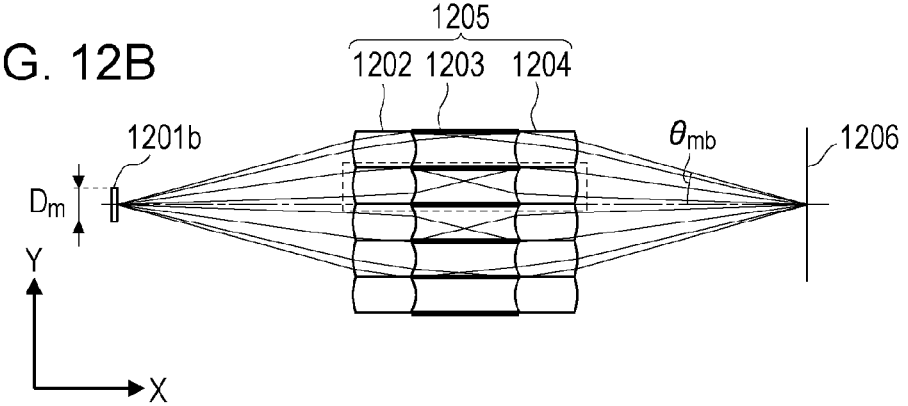
Figure 12C:
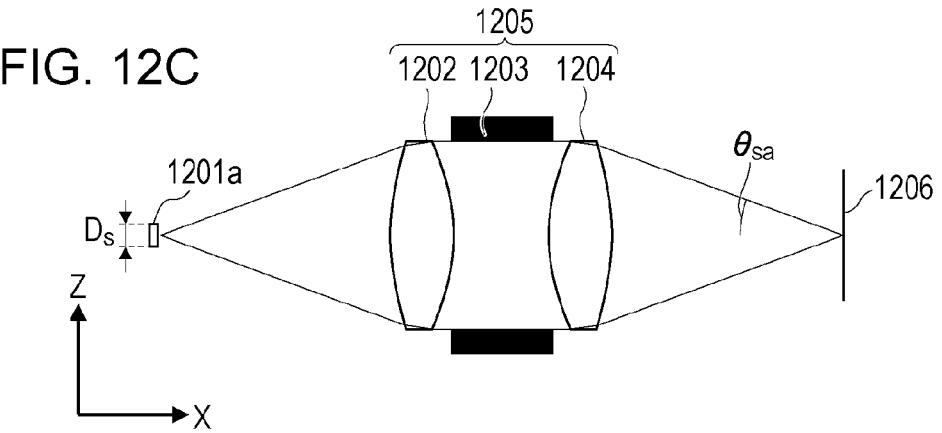
Figure 12D:
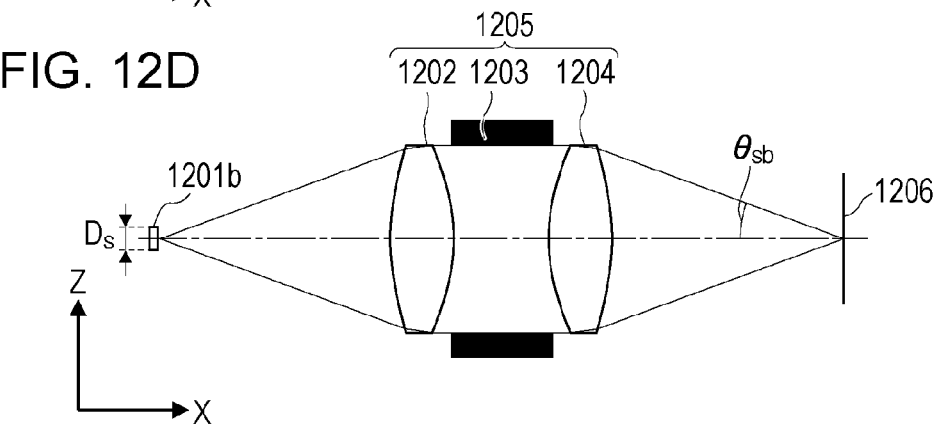

FIGS. 12A through 12D are schematic diagrams of principal portions of an optical apparatus according to the present embodiment, with FIGS. 12A and 12B illustrating the X-Y cross-section, and FIGS. 12C and 12D illustrating the Z-X cross-section. The optical apparatus according to the present embodiment includes a light source 1201 including multiple light-emitting points arrayed on an object plane, and an imaging optical system 1205 which condenses multiple light rays emitted from the light source 1201 upon a light-receiving surface (image plane) 1206.

The imaging optical system 1205 is a lens array including multiple lens optical systems 1205a arrayed in the first direction, and shielding portions 1203 to shield stray light rays. The optical systems 1205a include imaging unit 1202 and 1204 disposed on the same optical axis. In the same way as with the first embodiment, the imaging units 1202 and 1204 each have lens portions of the same form arrayed at equal intervals in the first direction at equal intervals, and the imaging units 1202 and 1204 are symmetrical with regard to the optical axis direction. Lens surfaces 1202a and 1202b, of the imaging unit 1202, and 1204a and 1204b, of the imaging unit 1204 all have anamorphic aspheric forms (anamorphic surfaces). The aspheric forms thereof are expressed in Expression (1) described above.

Properties of the imaging optical system 1205 according to the present embodiment are shown in Table 8.

intermediate object height in X-Y cross-section is imaged on the light-receiving surface 1206 by the imaging optical system 1205. Light rays emitted from the light-emitting points 1201a and 1201b are temporarily condensed at the intermediate imaging plane A by way of the imaging unit 1202, and subsequently condensed on the light-receiving surface 1206 by way of the imaging unit 1204.

The present embodiment differs from the first embodiment with regard to the point that the light rays emitted from the light-emitting point 1201a pass through three lens optical systems 1205a, and the light rays emitted from the light-emitting point 1201b pass through four lens optical systems 1205a. The half-value of the angle of divergence of the light rays emitted from the light-emitting point 1201a is $\theta_{ma}$ of 11.81 degrees, and the half-value of the angle of divergence of the light rays emitted from the light-emitting point 1201b is $\theta_{mb}$ of 15.59 degrees. The half-value $\theta_m$ of the angle of divergence of the optical flux changes depending on

TABLE 8

| Configuration | | | Aspheric form | | | | | | |
|---|---|---|---|---|---|---|---|---|---|
| | | | Lens surface 1202a | | Lens surface 1202b | | Lens surface 1204b | | Lens surface 1204a |
| Resolution | dpi | 600 | | | | | | | |
| Wavelength | λ(nm) | 780 | R | 0 | R | 0 | R | 0 | R | 0 |
| Refractive index | n(λ = 780 nm) | 1.486 | k | 0 | k | 0 | k | 0 | k | 0 |
| F-No. in first direction of lens unit | Fno_m | 6.90 | A20 | 0.52414 | A20 | −1.27350 | A20 | 1.27350 | A20 | −0.52414 |
| F-No. in second direction of lens unit | Fno_s | 1.31 | A40 | −2.34636 | A40 | 0.73486 | A40 | −0.73486 | A40 | 2.34636 |
| Power in first direction of lens unit | βm | −0.24 | A60 | 15.12691 | A60 | −4.60626 | A60 | 4.60626 | A60 | −15.12691 |
| Array pitch in first direction of lens unit | p(mm) | 0.52 | A80 | −216.13320 | A80 | 8.52304 | A80 | −8.52304 | A80 | 216.13320 |
| Number of optical systems arrayed in first direction of lens unit | Nm(count) | 221 | A100 | −11.14076 | A100 | −19.97629 | A100 | 19.97629 | A100 | 11.14076 |
| Number of optical systems arrayed in second direction of lens unit | Ns(count) | 1 | A02 | 0.14572 | A02 | −1.15192 | A02 | 1.15192 | A02 | −0.14572 |
| Maximum object height of which lens unit can intake light | L(mm) | 1.035 | A22 | −0.11646 | A22 | 0.23666 | A22 | −0.23666 | A22 | 0.11646 |
| size of light-emitting point in first direction | Dm(um) | 42.30 | A42 | 0.69251 | A42 | −0.73229 | A42 | 0.73229 | A42 | −0.69251 |
| size of light-emitting point in second direction | Ds(um) | 25.40 | A62 | −0.32243 | A62 | 2.60923 | A62 | −2.60923 | A62 | 0.32243 |
| Aperture size | | | A82 | 0.12245 | A82 | −6.69795 | A82 | 6.69795 | A82 | −0.12245 |
| Aperture size in first direction of imaging unit 1202 | Am1(mm) | 0.50 | A04 | −0.01460 | A04 | 0.00082 | A04 | −0.00082 | A04 | 0.01460 |
| Aperture size in second direction of imaging unit 1202 | As1(mm) | 2.44 | A24 | 0.06767 | A24 | −0.00507 | A24 | 0.00507 | A24 | −0.06767 |
| Aperture size in first direction of imaging unit 1204 | Am2(mm) | 0.50 | A44 | −0.23917 | A44 | 0.02710 | A44 | −0.02710 | A44 | 0.23917 |
| Aperture size in second direction of imaging unit 1204 | As2(mm) | 2.44 | A64 | 0.62105 | A64 | −0.09276 | A64 | 0.09276 | A64 | −0.62105 |
| Placement | | | A06 | 0.00261 | A06 | −0.00001 | A06 | 0.00001 | A06 | −0.00001 |
| Distance between light source 1201 and lens surface 1202a | d1(mm) | 3.30 | A26 | −0.02011 | A26 | 0.00010 | A26 | −0.00010 | A26 | 0.02011 |
| Distance between lens surface 1202a and lens surface 1202b | d2(mm) | 0.90 | A46 | 0.08062 | A46 | −0.00049 | A46 | 0.00049 | A46 | −0.08062 |
| Distance between lens surface 1202b and lens surface 1204a | d3(mm) | 1.36 | A08 | −0.00043 | A08 | 0.00000 | A08 | 0.00000 | A08 | 0.00043 |
| Distance between lens surface 1204a and lens surface 1204b | d4(mm) | 0.90 | A28 | 0.00334 | A28 | 0.00000 | A28 | 0.00000 | A28 | −0.00334 |
| Distance between lens surface 1204b and light-receiving surface 1206 | d5(mm) | 3.30 | A010 | 0.00003 | A010 | 0.00000 | A010 | 0.00000 | A010 | −0.00003 |

FIG. 12A is a diagram illustrating the way in which a light-emitting point 1201a at axial object height in the X-Y cross-section is imaged on the light-receiving surface 1206 by the imaging optical system 1205. FIG. 12B is a diagram illustrating the way in which a light-emitting point 1201b at the position of the light-emitting point in the X-Y cross-section, so the depth of field differs depending on the position of the light-emitting point.

On the other hand, in the Z-X cross-section, light rays emitted from the light-emitting points 1201a and 1201b become parallel light by way of the imaging unit 1202, and then are input to the imaging unit 1204 and condensed on the light-receiving surface 1206, as illustrated in FIGS. 10C and 10D. The imaging optical system 1205 here is an inverted same-size imaging system in the Z-X cross-section, so the light rays emitted from each of the light-emitting points 1201a and 1201b only pass through one lens optical system 1205a. Note that the half-value of the angle of divergence of the imaging optical fluxes of the light rays emitted from the light-emitting points 1201a and 1201b, is $\theta_{sa}$ and $\theta_{sb}$, both of 22.47 degrees. Thus, in the Z-X cross-section, the half-value $\theta_s$ of the incident angle of an imaging optical flux is constant regardless of the position of the light-emitting points, so the depth of field is also constant regardless of the position of the light-emitting points.

As described above, while the depth of field of the imaging optical system 1205 in the X-Y cross-section differs depending on the position of the light-emitting points, the depth of field in the Z-X cross-section is constant regardless of the position of the light-emitting points. Accordingly, the optical apparatus according to the present embodiment is designed such that the depth of field when light-emitting points at intermediate object height are imaged on the light-receiving surface 1206 is approximately equal in the X-Y cross-section and in the Z-X cross-section. Thus, the smallest depth of field in the X-Y cross-section and the depth of field in the Z-X cross-section can be made to be approximately equal, so imaging capabilities can be stabilized while securing maximal light.

Now, let us calculate the maximum number of lens optical systems 1205a through which light rays from one light-emitting point pass. In the present embodiment, the maximum object height L regarding which one lens optical system 105a can take in light rays is 1.035 mm, and the array pitch p of lens optical systems 1205a is 0.52. Accordingly, $n_m$ (the maximum number of lens optical systems 1205a through which light rays from one light-emitting point pass in the X-Y cross-section)=1+integer portion (2×L/p)=4. Also, the maximum number $n_m'$ assuming contrast of 40 to 80%=1+integer portion (2×0.85 L/p)=4. Since $n_m$ and $n_m'$ are equal, advantages of the present invention can be obtained with a configuration satisfying conditional Expressions (5) and (10) in both cases of taking into consideration contrast of 100% and contrast of 40 to 80%.

In the present embodiment, $n_m$ is an even number, so the half-value $\theta_m$ of the angle of divergence is the maximum (maximum value) when an imaging optical flux from a light-emitting point at intermediate object height is input to the light-receiving surface 1206. At this time, the half-value of the maximum value of the incident angle of an imaging optical flux in X-Y cross-section is 15.59 degrees. On the other hand, as described above, the maximum number of lens optical systems 1205a through which light rays from one light-emitting point pass in the X-Y cross-section is $n_s$ of one, and the half-value of the angle of divergence of the imaging optical flux, is $\theta_s$ of 22.47 degrees. Also, the aperture size $A_s$ of the imaging units in the second direction, i.e., the maximum effective width T of the imaging optical system 1205 in the second direction is 2.44 mm.

The imaging optical system 1205 according to the present embodiment forms same-size images of each of the light-emitting points of the light source 1201 on the light-receiving surface 1206, in each of the X-Y cross-section and Z-X cross-section. Thus, the image size $D_m$ on the light-receiving surface 1206 in the X-Y cross-section is 42.30 μm which is equal to the size of the light-emitting points. The image size $D_s$ on the light-receiving surface 1206 in the Z-X cross-section is the same 25.40 μm. In the same way as with the first embodiment, resolution P is evaluated as 11.81 lp/mm (equivalent to 600 dpi) in the X-Y cross-section and Z-X cross-section.

Substituting these numerical values into the middle member of conditional Expressions (5) and (10) yields Expressions (23) and (24), and we can see that conditional Expressions (5) and (10) are satisfied.

[Math. 23]

$$\frac{P_m}{P_s}\frac{1-P_sD_s}{1-P_mD_m}\frac{\tan\theta_m}{\tan\theta_s}=0.94 \tag{23}$$

[Math. 24]

$$\frac{P_m}{P_s}\frac{1-P_sD_s}{1-P_mD_m}\frac{n_m p}{T}=1.19 \tag{24}$$

Figure 13A:
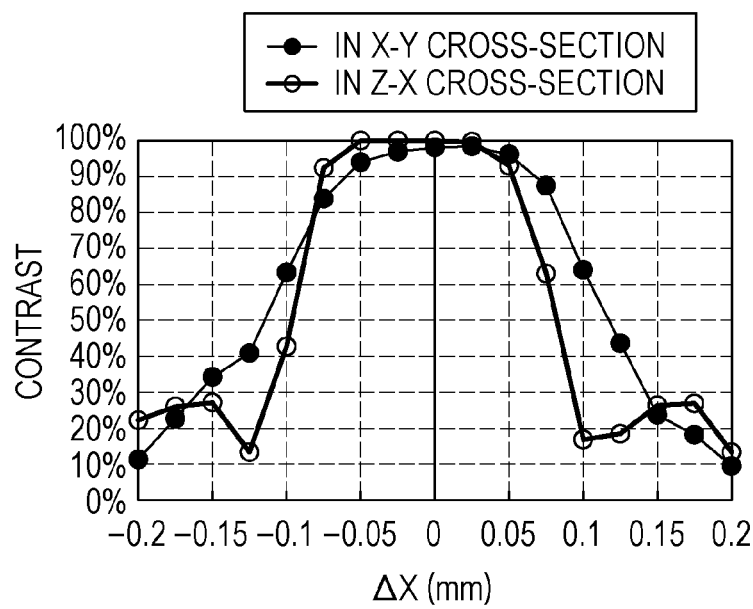
FIGS. 13A and 13B are diagrams illustrating depth of field properties of an imaging optical system according to the fifth embodiment.
Figure 13B:
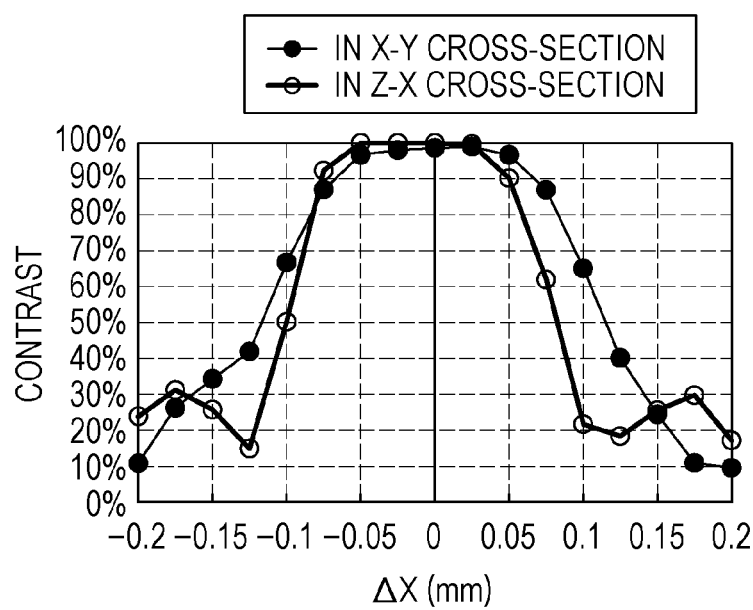

FIGS. 13A and 13B are diagrams illustrating depth properties of the imaging optical system 1205 according to the present embodiment in the X-Y cross-section and in the Z-X cross-section, in the same way as with the first embodiment. FIG. 13A illustrates the relationship between depth of field and contrast when a light-emitting point at axial object height is imaged on the light-receiving surface 1206, and in the same way as with FIG. 5A, the depth of field in the X-Y cross-section is greater than the depth of field in the Z-X cross-section at each contrast value. On the other hand, FIG. 13B illustrates that the depth of field in the X-Y cross-section and in the Z-X cross-section is approximately equal, due to the relationship between depth of field and contrast, when a light-emitting point at intermediate object height is imaged on the light-receiving surface 1206.

Table 9 illustrates the depth of field for each of in the X-Y cross-section and in the Z-X cross-section for each contrast and the ratio thereof, when a light-emitting point at intermediate object height is imaged on the light-receiving surface 1206.

TABLE 9

| Contrast | Δxm | Δxs | Δxm/Δxs |
|---|---|---|---|
| 100% | 0.060 | 0.086 | 1.46 |
| 90% | 0.134 | 0.127 | 0.96 |
| 80% | 0.167 | 0.141 | 0.85 |
| 70% | 0.190 | 0.156 | 0.82 |
| 60% | 0.212 | 0.170 | 0.79 |
| 50% | 0.232 | 0.183 | 0.77 |
| 40% | 0.257 | 0.196 | 0.74 |

Table 9 shows that the depth of field can be made approximately equal in the X-Y cross-section and in the Z-X cross-section, in the contrast range of 40 to 90%. Thus it has been demonstrated that the depth of field in the X-Y cross-section and in the Z-X cross-section can be made the same when a light-emitting point at intermediate object height is being imaged on the light-receiving surface 1206, by configuring the optical apparatus according to the present embodiment so as to satisfy conditional Expressions (5) and (10). Thus, good imaging capabilities can be achieved while securing light available efficiency with the optical apparatus according to the present embodiment, even if the number of lens optical systems through which light rays from each light-emitting point pass, increases.

Note that the power in the X-Y cross-section of each lens optical system has to be increased in accordance with increase in the number of lens optical systems through which light rays from one light-emitting point pass with the present embodiment, but increased power also increases aberration, which is undesirable. Accordingly, $n_m$ and $n_m'$ are preferably four or less, taking into consideration the imaging capabilities of the lens optical system.

Sixth Embodiment

Next, an optical apparatus according to a third embodiment of the present invention will be described in detail. Components which are the same as or equivalent to those in the first embodiment will be denoted with the same reference numerals, and description thereof simplified or omitted. The present embodiment is a configuration where the lens optical systems according to the first embodiment have been divided into top and bottom, and one thereof shifted in the first direction by half-pitch of the lens optical systems.

Figure 14A:
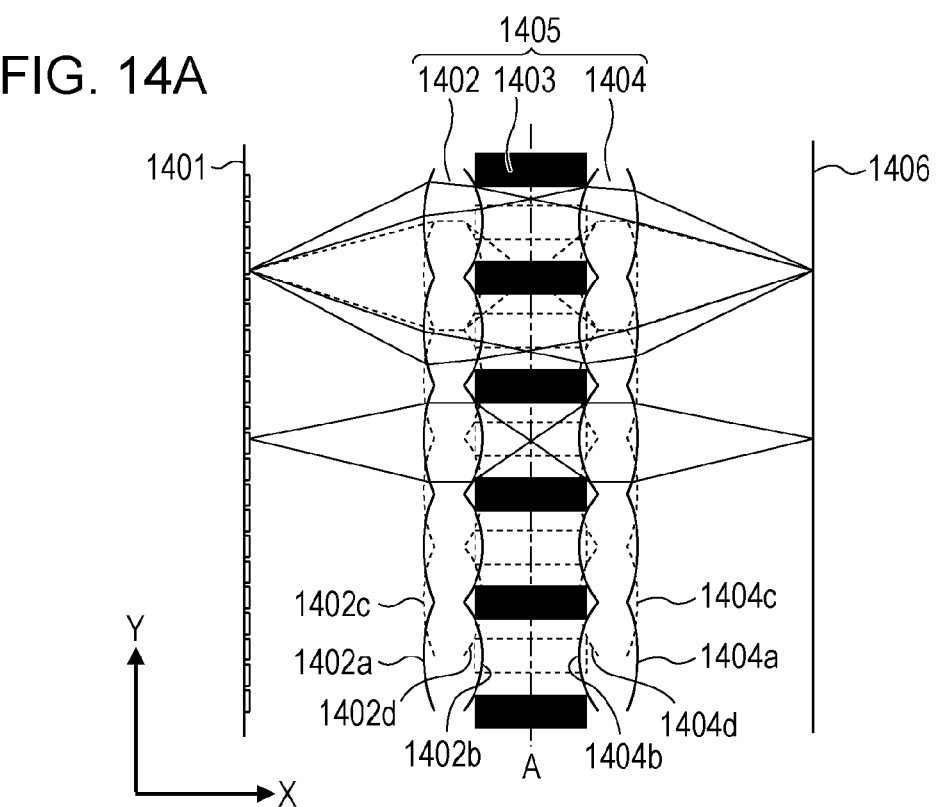
FIGS. 14A through 14C are schematic diagrams of principal portions of an optical apparatus according to a sixth embodiment.
Figure 14B:
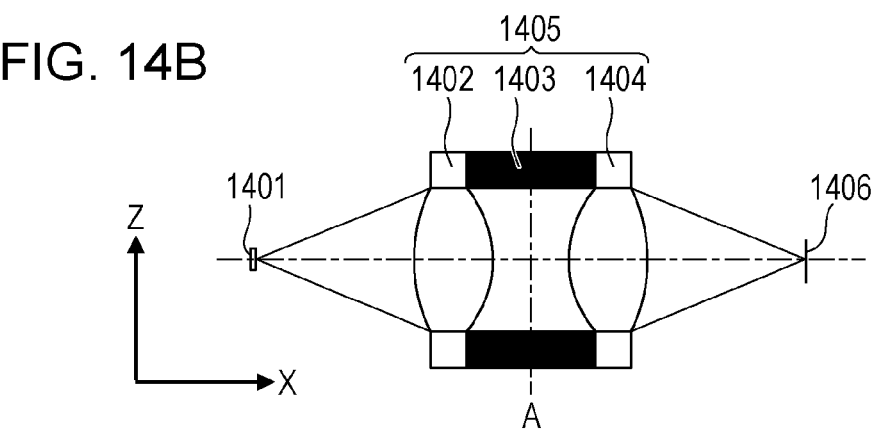
Figure 14C:
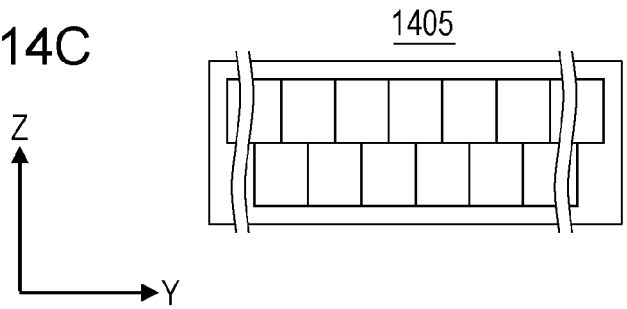

FIGS. 14A through 14C are schematic diagrams of principal portions of an optical apparatus according to the present embodiment. FIG. 14A illustrates the X-Y cross-section, FIG. 1B illustrates the Z-X cross-section, and FIG. 14C is a frontal view from the X direction. The optical apparatus according to the present embodiment includes a light source 1401 including multiple light-emitting points arrayed on an object plane, and an imaging optical system 1405 which condenses multiple light rays emitted from the light source 1401 upon a light-receiving surface 1406.

The imaging optical system 1405 is a lens array including multiple lens optical systems 1405a arrayed in the first direction, and shielding portions 1403 to shield stray light rays. The lens optical systems 1405a include imaging units 1402 and 1404 situated on the same optical axis. Unlike the first embodiment, the imaging units 1402 and 1404 each include two lens rows in the second direction. Each lens row is configured of multiple lens portions of the same shape being arrayed in the first direction at equal intervals. The two lens rows making up each of the imaging units 1402 and 1404 are configured such that the lens row making up each imaging unit in the first embodiment is divided top and bottom and shifted in the first direction by a half-pitch of the lens unit array interval. The imaging unit 1402 and imaging unit 1404 are situated symmetrically as to the optical axis direction.

Lens surfaces 1402a through 1402d of the imaging unit 1402 and lens surfaces 1404a through 1404d of the imaging unit 1404 each have anamorphic aspheric forms (anamorphic surfaces). The aspheric forms thereof are expressed in Expression (1) described above.

Properties of the imaging optical system 1405 according to the present embodiment are shown in Table 10.

TABLE 10

| | | | Aspheric form | | | | | | | |
|---|---|---|---|---|---|---|---|---|---|---|
| Configuration | | | Lens surface | | Lens surface | | Lens surface | | Lens surface | |
| Resolution | dpi | 600 | 1402a, 1402c | | 1402b, 1402d | | 1404b, 1404d | | 1404a, 1404c | |
| Wavelength | λ(nm) | 780 | R | 0 | R | 0 | R | 0 | R | 0 |
| Refractive index | n(λ = 780 nm) | 1.486 | k | 0 | k | 0 | k | 0 | k | 0 |
| F-No. in first direction of lens unit | Fno_m | 3.90 | A20 | 0.50277 | A20 | −0.82549 | A20 | 0.82549 | A20 | −0.50277 |
| F-No. in second direction of lens unit | Fno_s | 1.30 | A40 | −0.51259 | A40 | 0.29164 | A40 | −0.29164 | A40 | 0.51259 |
| Power in first direction of lens unit | βm | −0.45 | A60 | −0.24716 | A60 | −0.55971 | A60 | 0.55971 | A60 | 0.24716 |
| Array pitch in first direction of lens unit | p(mm) | 0.77 | A80 | 0.08357 | A80 | −0.01894 | A80 | 0.01894 | A80 | −0.08357 |
| Number of optical systems arrayed in first direction of lens unit | Nm(count) | 291 | A100 | −6.91825 | A100 | −0.78249 | A100 | 0.78249 | A100 | 6.91825 |
| Number of optical systems arrayed in second direction of lens unit | Ns(count) | 1 | A02 | 0.15643 | A02 | −0.19504 | A02 | 0.19504 | A02 | −0.15643 |
| Maximum object height of which lens unit can intake light | L(mm) | 0.768 | A22 | −0.15873 | A22 | 0.09481 | A22 | −0.09481 | A22 | 0.15873 |
| size of light-emitting point in first direction | Dm(um) | 42.30 | A42 | −0.15055 | A42 | −0.30023 | A42 | 0.30023 | A42 | 0.15055 |
| size of light-emitting point in second direction | Ds(um) | 25.40 | A62 | 5.65920 | A62 | 3.06561 | A62 | −3.06561 | A62 | −5.65920 |
| Aperture size | | | A82 | −13.83601 | A82 | −6.53977 | A82 | 6.53977 | A82 | 13.83601 |
| Aperture size in first direction of imaging unit 1402 | Am1(mm) | 0.7 | A04 | −0.03679 | A04 | −0.00756 | A04 | 0.00756 | A04 | 0.03679 |
| Aperture size in second direction of imaging unit 1402 | As1(mm) | 1.22 | A24 | 0.14799 | A24 | 0.03211 | A24 | −0.03211 | A24 | −0.14799 |
| Aperture size in first direction of imaging unit 1404 | Am2(mm) | 0.7 | A44 | −1.03706 | A44 | −0.59005 | A44 | 0.59005 | A44 | 1.03706 |
| Aperture size in second direction of imaging unit 1404 | As2(mm) | 1.22 | A64 | −1.89450 | A64 | −0.69876 | A64 | 0.69876 | A64 | 1.89450 |
| Placement | | | A06 | 0.01270 | A06 | 0.00111 | A06 | −0.00111 | A06 | −0.01270 |
| Distance between light source 1401 and lens surface 1402a | d1(mm) | 2.65 | A26 | −0.07715 | A26 | −0.00101 | A26 | 0.00101 | A26 | 0.07715 |
| Distance between lens surface 1402a and lens surface 1402b | d2(mm) | 1.25 | A46 | 0.97142 | A46 | 0.41327 | A46 | −0.41327 | A46 | −0.97142 |
| Distance between lens surface 1402b and lens surface 1404a | d3(mm) | 2.16 | A08 | −0.00611 | A08 | −0.00105 | A08 | 0.00105 | A08 | 0.00611 |
| Distance between lens surface 1404a and lens surface 1404b | d4(mm) | 1.25 | A28 | −0.01342 | A28 | −0.01827 | A28 | 0.01827 | A28 | 0.01342 |
| Distance between lens surface 1404b and light-receiving surface 1406 | d5(mm) | 2.65 | A010 | 0.00128 | A010 | 0.00010 | A010 | −0.00010 | A010 | −0.00128 |

FIG. 15A is a diagram illustrating the way in which a light-emitting point 1401a at axial object height in the X-Y cross-section is imaged on the light-receiving surface 1406 by the imaging optical system 1405. FIG. 15B is a diagram illustrating the way in which a light-emitting point 1401b at intermediate object height in Z-X in X-Y cross-section is imaged on the light-receiving surface 1406.

Now, the present embodiment differs from the other embodiments described above with regard to the positions of the light-emitting points 1401b at intermediate object height. Specifically, the light-emitting points 1401b are not situated at intermediate positions between optical axes of lens optical systems 1405a adjacent in the first direction (Y direction), but are situated at intermediate positions between optical axes of lens optical systems 1405a adjacent in the second direction (Z direction). This is because the lens optical systems 1405a have a configuration of being divided top and bottom and shifted by half-pitch.

Light rays emitted from each of the light-emitting points 1401a and 1401b are temporarily condensed at the intermediate imaging plane A by way of the imaging unit 1402, and subsequently condensed on the light-receiving surface 1406 by way of the imaging unit 1404. The half-values of the angles of divergence of the light rays emitted from the light-emitting points 1401a and 1401b in the X-Y cross-section are $\theta_{ma}$ and $\theta_{mb}$ of 7.32 degrees and 13.38 degrees, respectively.

On the other hand, light rays emitted from the light-emitting points 1401a and 1401b in the Z-X cross-section become approximately parallel light by way of the imaging unit 1402, and then are input to the imaging unit 1404 and condensed on the light-receiving surface 1406, as illustrated in FIGS. 15C and 15D. The half-value of the angle of divergence of the imaging optical fluxes of the light rays emitted from the light-emitting points 1401a and 1401b, is $\theta_{sa}$ and $\theta_{sb}$ both of 21.14 degrees. Thus, in the Z-X cross-section, the half-value $\theta_s$ is constant regardless of the position of the light-emitting points, so the depth of field is also constant regardless of the position of the light-emitting points.

As described above, while the depth of field of the imaging optical system 1405 in the X-Y cross-section differs depending on the position of the light-emitting points, the depth of field in the Z-X cross-section is constant regardless of the position of the light-emitting points. Accordingly, the optical apparatus according to the present embodiment is designed such that the depth of field when light-emitting points at intermediate object height are imaged on the light-receiving surface 1406 is approximately equal in the X-Y cross-section and in the Z-X cross-section. Thus, the smallest depth of field in the X-Y cross-section and the depth of field in the Z-X cross-section can be made to be approximately equal, so imaging capabilities can be stabilized while securing maximal light.

Now, let us calculate the maximum number of lens optical systems 1405a through which light rays from one light-emitting point pass. In a case where Expression (10) is to be applied to a configuration where multiple lens rows are arrayed in the second direction as with the present embodiment, lens rows where light rays on the extreme periphery are input have to be taken into consideration. Accordingly, $n_m$, which is the maximum number of lens optical systems 1405a through which light rays from one light-emitting point pass in the X-Y cross-section, and the aperture size $A_m$ of the lens optical system 1405a in the first direction, are taken into consideration. Specifically, we will consider application of Expression (10) to a lens row where the value of $n_m \times A_m$ is maximum.

In the present embodiment, the maximum object height L regarding which one lens optical system 105a can take in light rays is 0.768 mm, and the array pitch p of lens optical systems 1405a is 0.77 mm. At this time, $n_m$ (the maximum number of lens optical systems 705a through which light rays from one light-emitting point pass in the X-Y cross-section)=1+integer portion (2×L/p)=2. Also, the maximum effective number $n_m'$ taking contrast of 40 to 80% is $n_m'$=1+integer portion (2×0.85 L/p)=2. Further, the aperture size $A_m$ in the first direction is 0.7 mm for both upper and lower lens optical systems 1405a, so $n_m \times A_m$=1.4 mm holds. The value of $n_m \times A_m$ is equal for the upper and lower lens optical systems 1405a in the present embodiment, so advantages of the present invention can be obtained with a configuration satisfying conditional Expressions (5) and (10) at either row. Also, $n_m$ and $n_m'$ are equal, so advantages of the present invention can be obtained with a configuration satisfying conditional Expressions (5) and (10) in both cases of taking into consideration contrast of 100% and contrast of 40 to 80%.

In the present embodiment, $n_m$ is an even number, so the half-value $\theta_{ms}$ of the angle of divergence is the maximum (maximum value) when an imaging optical flux from a light-emitting point at intermediate object height is input to the light-receiving surface 1406. At this time, the half-value of the maximum value of the incident angle of an imaging optical flux in X-Y cross-section is 13.38 degrees. On the other hand, as described above, the maximum number of lens optical systems 1405a through which light rays from one light-emitting point pass in the Z-X cross-section is $n_s$ of two, and the half-value of the angle of divergence of the imaging optical flux, is $\theta_s$ of 21.14 degrees. Also, the aperture size $A_s$ of the lens optical systems 1405a for the upper and lower lens rows is 1.22 mm, so the maximum effective width T of the imaging optical system 1405 in the second direction is 2.44 mm.

The imaging optical system 1405 according to the present embodiment forms same-size images of each of the light-emitting points of the light source 1401 on the light-receiving surface 1406, in each of the X-Y cross-section and Z-X cross-section. Thus, the image size $D_m$ on the light-receiving surface 1406 in the X-Y cross-section is 42.30 µm which is equal to the size of the light-emitting points, and the image size $D_s$ on the light-receiving surface 1406 in the Z-X cross-section is 25.40 µm which is equal to the size of the light-emitting points. In the same way as with the first embodiment, resolution P is evaluated as 11.81 lp/mm (equivalent to 600 dpi) in the X-Y cross-section and Z-X cross-section.

Substituting these numerical values into the middle member of conditional Expressions (5) and (10) yields the following Expressions (25) and (26), and we can see that conditional Expressions (5) and (10) are satisfied.

[Math. 25]

$$\frac{P_m}{P_s} \frac{1-P_sD_s}{1-P_mD_m} \frac{\tan\theta_m}{\tan\theta_s} = 0.86 \qquad (25)$$

[Math. 12]

$$\frac{P_m}{P_s} \frac{1-P_sD_s}{1-P_mD_m} \frac{n_m p}{T} = 0.88 \qquad (26)$$

Figure 16A:
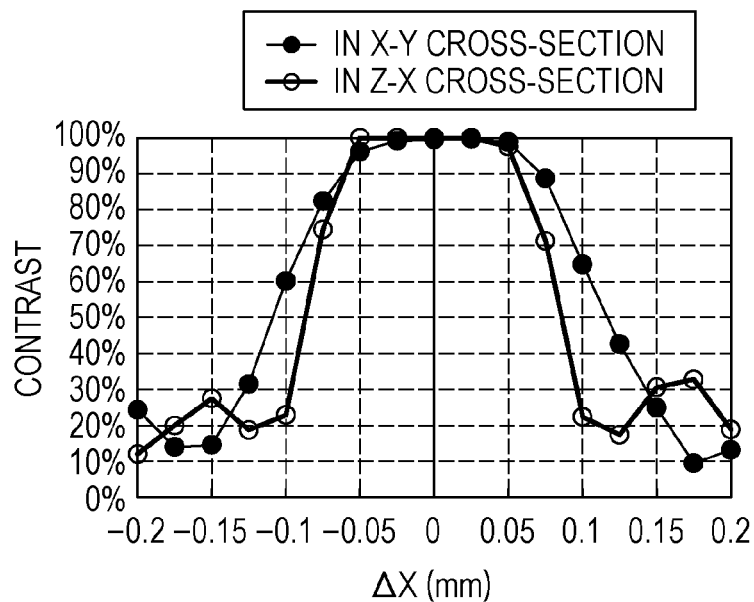
FIGS. 16A and 16B are diagrams illustrating depth of field properties of an imaging optical system according to the sixth embodiment.
Figure 16B:
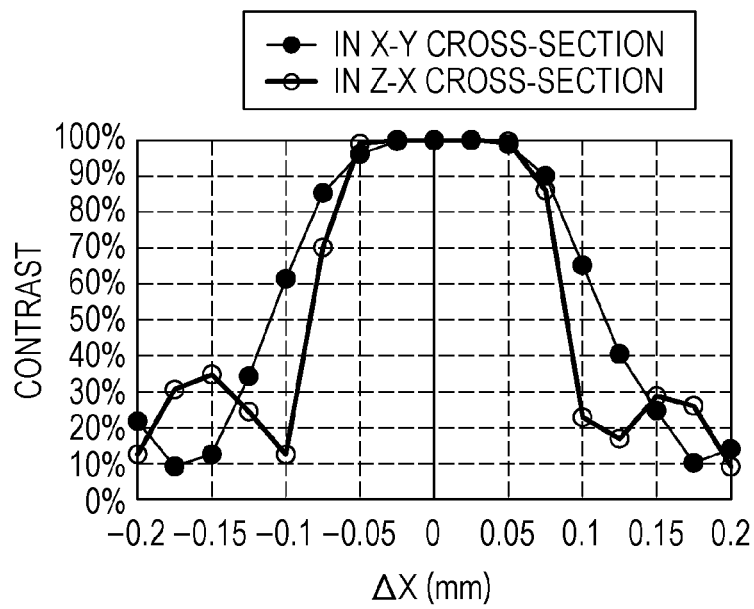

FIGS. 16A and 16B are diagrams illustrating depth properties of the imaging optical system 1405 according to the present embodiment in the X-Y cross-section and in the Z-X cross-section, in the same way as with the first embodiment. FIG. 16A illustrates the relationship between depth of field and contrast when a light-emitting point at axial object height is imaged on the light-receiving surface 1406. Also, FIG. 16B illustrates the relationship between depth of field and contrast when a light-emitting point at intermediate object height of each lens optical system 1405a is imaged on the light-receiving surface 1406. FIG. 16B illustrates that the depth of field in the X-Y cross-section and in the Z-X cross-section is approximately equal.

Table 11 illustrates the depth of field for each of in the X-Y cross-section and in the Z-X cross-section for each contrast and the ratio thereof, when a light-emitting point at intermediate object height is imaged on the light-receiving surface 1406.

TABLE 11

| Contrast | Δxm | Δxs | Δxm/Δxs |
|---|---|---|---|
| 100% | 0.089 | 0.104 | 1.09 |
| 90% | 0.139 | 0.125 | 0.84 |
| 80% | 0.166 | 0.144 | 0.82 |
| 70% | 0.186 | 0.156 | 0.82 |
| 60% | 0.207 | 0.165 | 0.79 |
| 50% | 0.226 | 0.173 | 0.76 |
| 40% | 0.245 | 0.181 | 0.74 |

Table 11 shows that the depth of field can be made approximately equal in the X-Y cross-section and in the Z-X cross-section, in the contrast range of 70 to 100%. Thus it has been demonstrated that the depth of field in the X-Y cross-section and in the Z-X cross-section can be made the same when a light-emitting point at intermediate object height is being imaged on the light-receiving surface 1406, by configuring the optical apparatus according to the present embodiment so as to satisfy conditional Expressions (5) and (10).

Thus, good imaging capabilities can be achieved while securing light available efficiency with the optical apparatus according to the present embodiment, even with a configuration where a lens row is divided top and bottom.

Image Forming Apparatus

Figure 17:
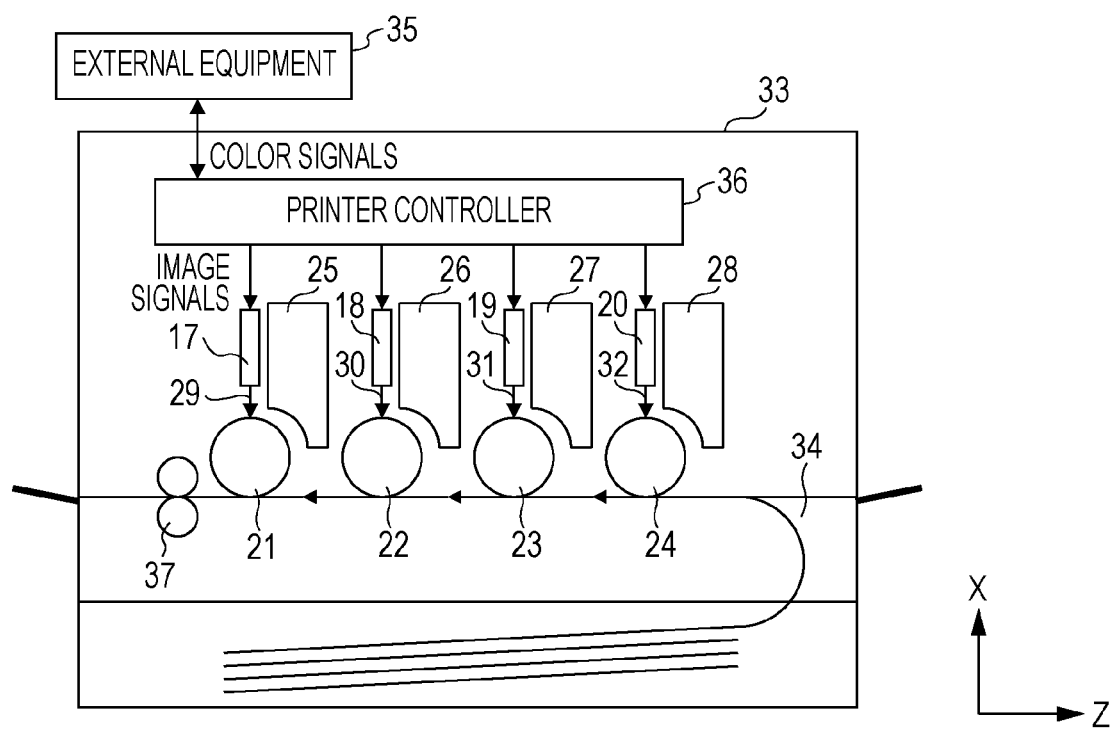
FIG. 17 is a schematic diagram of principal portions of an image forming apparatus according to an embodiment.

FIG. 17 is a schematic diagram (Z-X cross-sectional view) of principal portions of a color image forming apparatus 33 according to an embodiment of the present invention. The color image forming apparatus 33 is a tandem-type color image forming apparatus, which has four of any one of the optical apparatuses (exposure units) illustrated in the embodiments described above, each exposing the light-receiving surface (photosensitive surface) of photosensitive drums in conjunction. The color image forming apparatus 33 includes optical apparatuses 17, 18, 19, and 20, having one of the configurations illustrated in the embodiments, photosensitive drums 21, 22, 23, and 24, serving as image carrying members, developing units 25, 26, 27, and 28, a conveying belt 34, and a fixing unit 37. The optical apparatuses 17, 18, 19, and 20 are each disposed such that the second direction of the imaging optical systems matches the sub-scanning direction (Z direction) of the photosensitive drums 21, 22, 23, and 24, which is the direction of rotation thereof.

In FIG. 17, the color image forming apparatus 33 receives input of color signals of R (red), G (green), and B (blue), from external equipment 35 such as a personal computer or the like. These color signals are converted into image signals (dot data) of C (cyan), M (magenta), Y (yellow), and K (black) by a printer controller 36 within the apparatus, and input to the respective optical apparatuses 17, 18, 19, and 20. The printer controller 36 controls each part of the color image forming apparatus 33, besides signal conversion.

Exposure lights 29, 30, 31, 32 modulated in accordance with the color image signals is emitted from the optical apparatuses 17, 18, 19, and 20, respectively. The exposure lights 29, 30, 31, 32 expose the photosensitive surfaces of the photosensitive drums 21, 22, 23, and 24 charged by charging rollers omitted from illustration, forming electrostatic latent images on the photosensitive surfaces of each. Subsequently, the electrostatic latent images on the photosensitive surfaces of the photosensitive drums 21, 22, 23, and 24 developed by respective developing units 25, 26, 27, and 28, as toner images. The toner images of each color are transferred by overlaying onto a transfer medium, by a transferring unit omitted from illustration, and then fixed by the fixing unit, thereby completing one fill-color image.

Image Reading Apparatus

Optical apparatuses having a configuration according to any of the embodiments described above may be used in an image reading apparatus. In this case an optical apparatus is configured by a document being positioned at the object face of the imaging optical system, and a photoreceptor unit being positioned at the image plane (light-receiving surface). A line sensor configured of a CCD sensor or CMOS sensor or the like, for example, may be used as the photoreceptor unit. Also, a color digital photocopier may be configured by connecting the image reading apparatus as the above-described external equipment 35, to the color image forming apparatus 33.

An image reading apparatus can irradiate a document by an illumination unit including a light source, condense optical fluxes (reflected light or transmitted light) on an imaging optical system, and receive light by a sensor face of the photoreceptor unit. At this time, the imaging optical system is positioned such that the second direction thereof matches the direction in which the relative position between the document and the imaging optical system is changed (sub-scanning direction), whereby the document can be sequentially read in the sub-scanning direction.

Note that the illumination unit in the image reading apparatus is not restricted to a light source, an a configuration may be used where external light is guided to the original. Here, the image on the original at the light-receiving surface of the photoreceptor unit which the image reading device has can be conceived as being made up of infinitely small dotes. Accordingly, in a case of applying the above-described Expressions (5) and (10) to an optical apparatus relating to an image reading apparatus, $D_i=0$ can be set and transformation made as with the following Expressions (27) and (28).

[Math. 26]

$$0.8 \leq \frac{P_m}{P_s} \frac{\tan\theta_m}{\tan\theta_s} \leq 1.2 \tag{27}$$

[Math. 27]

$$0.8 \leq \frac{P_m}{P_s} \frac{n_m P}{T} \leq 1.2 \tag{28}$$

Modifications

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the embodiments have been described above as configurations where Expression (5) is satisfied by innovating the designed aperture size of the lens portions in the first direction and second direction, but design methods for the optical apparatus to satisfy Expression (5) are not restricted to this. For example, a configuration may be employed where innovation is made regarding size of the light-emitting points of the light source in the first direction and second direction to satisfy Expression (5).

Also, the lens surfaces of the imaging optical system in the embodiments have aspheric forms expressed by Expression (1), but the present invention is not restricted to this, and aspheric forms expressed by other expressions may be employed. Also, while light-emitting points are imaged inverted on the light-receiving surface without intermediate imaging in the Z-X cross-section, the light-emitting points may be imaged erect on the light-receiving surface after intermediate imaging, as with the X-Y cross-section.

Further, configurations where two rows of imaging units are arrayed have been described for the imaging optical system in the embodiments, but the number of imaging units is not restricted thereto, and an imaging optical system may be configured having three or more imaging units. Also, while the imaging unit in the sixth embodiment is of a configuration having two lens rows in the second direction, an imaging unit may be configured having three or more lens rows in the second direction.

Also, while the light source according to the embodiments has been described as a configuration where multiple light-emitting points are arrayed in a first direction alone, a configuration may be employed where multiple rows of the light-emitting points are arrayed in the second direction, and the multiple light-emitting points are arrayed in a staggered layout. This configuration enables a greater number of light-emitting points to be densely arrayed without consideration of space to other light-emitting points adjacent in the first direction, so resolution can be further improved.

The recording density of the above-described image forming apparatus and image reading apparatus is not restricted. However, when taking into consideration that the higher the recording density is, the higher the demanded image quality is, the optical apparatus according to the above-described embodiments exhibits greater advantages in image formation apparatuses of 1200 dpi or higher.

This application claims the benefit of Japanese Patent Application No. 2012-284439, filed Dec. 27, 2012, which is hereby incorporated by reference herein in its entirety.

The invention claimed is:

1. An optical apparatus comprising:
a light source including a plurality of light-emitting points arrayed in a first direction; and
an imaging optical system including a plurality of lens optical systems arrayed in the first direction wherein the imaging optical system forms images of the plurality of light-emitting points on a light-receiving surface; and
wherein a condition of $$0.8 \leq \frac{P_m}{P_s} \frac{1 - P_s D_s}{1 - P_m D_m} \frac{\tan\theta_m}{\tan\theta_s} \leq 1.2$$

is satisfied, where
in a first cross-section which is parallel to the first direction and an axial direction of the lens optical systems, $\theta_m$ represents a half-value of a maximum value of angle of divergence of an imaging optical flux input to the light-receiving surface, $P_m$ [lp/mm] represents resolution, and $D_m$ [mm] represents a size of each image of the plurality of light-emitting points, formed on the light-receiving surface, and
in a second cross-section which is perpendicular to the first direction, $\theta_s$ represents a half-value of a maximum value of angle of divergence of an imaging optical flux input to the light-receiving surface, $P_s$ [lp/mm] represents resolution, and $D_s$ [mm] represents a size of each image of the plurality of light-emitting points, formed on the light-receiving surface.

2. The optical apparatus according to claim 1, wherein $\theta_m$ is $\theta_m'$ which is half-value of a maximum value of effective angle of divergence, and $\theta_s$ is $\theta_s'$ which is half-value of a maximum value of effective angle of divergence.

3. The optical apparatus according to claim 1, wherein the imaging optical system performs erecting same-size imaging of each of the plurality of light-emitting points on the light-receiving surface in the first cross-section, and performs inverted imaging of each of the plurality of light-emitting points on the light-receiving surface in the second cross-section.

4. The optical apparatus according to claim 1, wherein the plurality of lens optical systems each have an anamorphic surface.

5. The optical apparatus according to claim 1, wherein the plurality of lens optical systems each include a plurality of lens portions arrayed in the optical axis direction of the lens optical systems.

6. The optical apparatus according to claim 1, wherein the imaging optical system is an enlarging system in the second cross-section.

7. The optical apparatus according to claim 1, wherein the plurality of light-emitting points are organic light-emitting devices.

8. An optical apparatus comprising:
a light source including a plurality of light-emitting points arrayed in a first direction; and
an imaging optical system including a plurality of lens optical systems arrayed in the first direction,
wherein the imaging optical system forms images of the plurality of light-emitting points on a light-receiving surface, and
wherein a condition of $$0.8 \leq \frac{P_m}{P_s} \frac{1 - P_s D_s}{1 - P_m D_m} \frac{n_m P}{T} \leq 1.2$$

is satisfied, where
in a first cross-section which is parallel to the first direction and an axial direction of the lens optical systems, p [mm] represents an array pitch of the plurality of lens optical systems, $n_m$ represents the maximum number of lens optical systems through which light rays from one of the plurality of light-emitting points pass, $P_m$ [lp/mm] represents resolution, and $D_m$ [mm] represents a size of each image of the plurality of light-emitting points, formed on the light-receiving surface, and
in a second cross-section which is perpendicular to the first direction, T [mm] represents the maximum effective width of the imaging optical system, $P_s$ [lp/mm] represents resolution, and $D_s$ [mm] represents a size of each image of the plurality of light-emitting points, formed on the light-receiving surface.

9. The optical apparatus according to claim 8, wherein the maximum number $n_m$ is the maximum effective number $n_m'$.

10. The optical apparatus according to claim 8, satisfying a condition of $n_m \leq 4$.

11. The optical apparatus according to claim 8, wherein the imaging optical system performs erecting same-size imaging of each of the plurality of light-emitting points on the light-receiving surface in the first cross-section, and performs inverted imaging of each of the plurality of light-emitting points on the light-receiving surface in the second cross-section.

12. The optical apparatus according to claim 8, wherein the plurality of lens optical systems each have an anamorphic surface.

13. The optical apparatus according to claim 8, wherein the plurality of lens optical systems each include a plurality of lens portions arrayed in the optical axis direction of the lens optical systems.

14. An image forming apparatus comprising:
an optical apparatus including
a light source including a plurality of light-emitting points arrayed in a first direction, and
an imaging optical system including a plurality of lens optical systems arrayed in the first direction,
wherein the imaging optical system forms images of the plurality of light-emitting points on a light-receiving surface,
wherein a condition of $$0.8 \leq \frac{P_m}{P_s} \frac{1-P_s D_s}{1-P_m D_m} \frac{\tan\theta_m}{\tan\theta_s} \leq 1.2$$

is satisfied, where
in a first cross-section which is parallel to the first direction and an axial direction of the lens optical systems, $\theta_m$ represents a half-value of a maximum value of angle of divergence of an imaging optical flux input to the light-receiving surface, $P_m$ [lp/mm] represents resolution, and $D_m$ [mm] represents a size of each image of the plurality of light-emitting points, formed on the light-receiving surface, and
in a second cross-section which is perpendicular to the first direction, $\theta_s$ represents a half-value of a maximum value of angle of divergence of an imaging optical flux input to the light-receiving surface, $P_s$ [lp/mm] represents resolution, and $D_s$ [mm] represents a size of each image of the plurality of light-emitting points, formed on the light-receiving surface;
a developing unit configured to develop an electrostatic latent image, formed on a photosensitive surface disposed on a photosensitive member, by the optical apparatus as a toner image;
a transfer unit configured to transfer the developed toner image to a transfer medium; and
a fixing unit configured to fix the transferred toner image into the transfer medium,
wherein the imaging optical system is disposed such that the second direction perpendicular to the first direction and optical axis direction of the lens optical systems is the rotational direction of the photosensitive member.

15. An optical apparatus comprising:
an imaging optical system including a plurality of lens optical systems arrayed in the first direction,
wherein the imaging optical system forms images of a document on a light-receiving surface, and
wherein a condition of $$0.8 \leq \frac{P_m}{P_s} \frac{\tan\theta_m}{\tan\theta_s} \leq 1.2$$

is satisfied, where
in a first cross-section which is parallel to the first direction and an axial direction of the lens optical systems, $\theta_m$ represents a half-value of a maximum value of angle of divergence of an imaging optical flux input to the photoreception unit, and $P_m$ [lp/mm] represents resolution, and
in a second cross-section which is perpendicular to the first direction, $\theta_s$ represents a half-value of a maximum value of angle of divergence of an imaging optical flux input to the light-receiving surface, and $P_s$ [lp/mm] represents resolution.

16. The optical apparatus according to claim 15, wherein $\theta_m$ is $\theta_m'$ which is half-value of a maximum value of effective angle of divergence, and $\theta_s$ is $\theta_s'$ which is half-value of a maximum value of effective angle of divergence.

17. An optical apparatus comprising:
an imaging optical system including a plurality of lens optical systems arrayed in the first direction,
wherein the imaging optical system forms an image of a document on a light-receiving surface, and
wherein a condition of $$0.8 \leq \frac{P_m}{P_s} \frac{n_m p}{T} \leq 1.2$$

is satisfied, where
in a first cross-section which is parallel to the first direction and an axial direction of the lens optical systems, p [mm] represents an array pitch of the plurality of lens optical systems, $n_m$ represents the maximum number of lens optical systems through which light rays from one of the plurality of light-emitting points pass, $P_m$ [lp/mm] represents resolution, and
is a second cross-section perpendicular to the first cross-section, T [mm] represents the maximum effective width of the imaging optical system, and $P_s$ [lp/mm] represents resolution.

18. The optical apparatus according to claim 17, wherein the maximum number $n_m$ is the maximum effective number $n_m'$.

19. An image reading apparatus comprising:
an optical apparatus including
an imaging optical system including a plurality of lens optical systems arrayed in a first direction,
wherein the imaging optical system forms images of the plurality of light-emitting points on a light-receiving surface,
wherein a condition of $$0.8 \leq \frac{P_m}{P_s} \frac{\tan\theta_m}{\tan\theta_s} \leq 1.2$$

is satisfied, where
in a first cross-section which is parallel to the first direction and an axial direction of the lens optical systems, $\theta_m$ represents a half-value of a maximum value of angle of divergence of an imaging optical flux input to the light-receiving surface, and $P_m$ [lp/mm] represents resolution, and in a second cross-section which is perpendicular to the first direction, $\theta_s$ represents a half-value of a maximum value of angle of divergence of an imaging optical flux input to the light-receiving surface, and $P_s$ [lp/mm] represents resolution;

an illumination unit configured to irradiate the document;

a photoreceptor unit disposed at the image plane of the imaging optical system, configured to receive light rays of the document on which light has been condensed by the imaging optical system; and a driving unit configured to change a relative position between the imaging optical system and the document in a second direction perpendicular to the first direction and the optical axis direction of the lens optical system.

* * * * *